(12) United States Patent
Wentzlaff

(10) Patent No.: US 7,853,774 B1
(45) Date of Patent: Dec. 14, 2010

(54) MANAGING BUFFER STORAGE IN A PARALLEL PROCESSING ENVIRONMENT

(75) Inventor: David Wentzlaff, Cambridge, MA (US)

(73) Assignee: Tilera Corporation, Westborough, MA (US)

( * ) Notice: Subject to any disclaimer, the term of this patent is extended or adjusted under 35 U.S.C. 154(b) by 148 days.

(21) Appl. No.: 11/314,270

(22) Filed: Dec. 21, 2005

Related U.S. Application Data

(60) Provisional application No. 60/665,563, filed on Mar. 25, 2005, provisional application No. 60/750,149, filed on Dec. 13, 2005.

(51) Int. Cl.
*G06F 15/00* (2006.01)
*G06F 15/76* (2006.01)
(52) U.S. Cl. ...................................................... 712/10
(58) Field of Classification Search .................... 712/10
See application file for complete search history.

(56) References Cited

U.S. PATENT DOCUMENTS

| 5,519,880 | A | * | 5/1996 | Okabayashi | 712/11 |
|---|---|---|---|---|---|
| 5,546,391 | A | * | 8/1996 | Hochschild et al. | 370/413 |
| 5,822,605 | A | | 10/1998 | Higuchi et al. | |
| 6,088,716 | A | * | 7/2000 | Stanfill et al. | 718/106 |
| 6,671,275 | B1 | * | 12/2003 | Wong et al. | 370/389 |
| 7,394,288 | B1 | | 7/2008 | Agarwal | |

OTHER PUBLICATIONS

Agarwal, Anant. "Raw Computation," *Scientific American* vol. 281, No. 2: 44-47, Aug. 1999.

Taylor, Michael Bedford et. al., "Evaluation of the Raw Microprocessor: An Exposed-Wire-Delay Architecture for ILP and Streams," *Proceedings of International Symposium on Computer Architecture*, Jun. 2004.

Taylor, Michael Bedford et. al., "Scalar Operand Networks: On-Chip Interconnect for ILP in Partitioned Architectures," *Proceedings of the International Symposium on High Performance Computer Architecture*, Feb. 2003.

Taylor, Michael Bedford et. al., "A 16-Issue Multiple-Program-Counter Microprocessor with Point-to-Point Scalar Operand Network," *Proceedings of the IEEE International Solid-State Circuits Conference*, Feb. 2003.

Taylor, Michael Bedford et. al., "The Raw Microprocessor: A Computational Fabric for Software Circuits and General-Purpose Programs," *IEEE Micro*, pp. 25-35, Mar.-Apr. 2002.

Lee, Walter et. al., "Space-Time Scheduling of Instruction-Level Parallelism on a Raw Machine," *Proceedings of the Eighth International Conference on Architectural Support for Programming Languages and Operating Systems (ASPLOS-VIII)*, San Jose, CA, Oct. 4-7, 1998.

(Continued)

*Primary Examiner*—Eddie P Chan
*Assistant Examiner*—Corey Faherty
(74) *Attorney, Agent, or Firm*—Fish & Richardson P.C.

(57) ABSTRACT

An integrated circuit including a plurality of tiles. Each tile comprises a processor; a switch including switching circuitry to forward data words over data paths from other tiles to the processor and to switches of other tiles; and memory coupled to the switch to buffer data transmitted among the tiles. The switches form a plurality of networks among the tiles. At least one of the networks is configured to transmit data among the tiles using an approach that reserves sufficient buffer space in the memories coupled to the switches to avoid deadlock conditions, and at least one of the networks is configured to transmit data among the tiles using an approach to detect and recover from deadlock conditions.

20 Claims, 21 Drawing Sheets

OTHER PUBLICATIONS

Kim, Jason Sungtae et. al., "Energy Characterization of a Tiled Architecture Processor with On-Chip Networks," *International Symposium on Low Power Electronics and Design*, Seoul, Korea, Aug. 25-27, 2003.

Barua, Rajeev et. al., "Compiler Support for Scalable and Efficient Memory Systems," *IEEE Transactions on Computers*, Nov. 2001.

Waingold, Elliot et. al., "Baring it all to Software: Raw Machines," *IEEE Computer*, pp. 86-93, Sep. 1997.

Lee, Walter et. al., "Convergent Scheduling," *Proceedings of the 35th International Symposium on Microarchitecture*, Istanbul, Turkey, Nov. 2002.

Wentzlaff, David and Anant Agarwal, "A Quantitative Comparison of Reconfigurable, Tiled, and Conventional Architectures on Bit-Level Computation," *MIT/LCS Technical Report LCS-TR-944*, Apr. 2004.

Suh, Jinwoo et. al., "A Performance Analysis of PIM, Stream Processing, and Tiled Processing on Memory-Intensive Signal Processing Kernels," *Proceedings of the International Symposium on Computer Architecture*, Jun. 2003.

Barua, Rajeev et. al., "Maps: A Compiler-Managed Memory System for Raw Machines," *Proceedings of the Twenty-Sixth International Symposium on Computer Architecture (ISCA-26)*, Atlanta, GA, Jun. 1999.

Barua, Rajeev et. al., "Memory Bank Disambiguation using Modulo Unrolling for Raw Machines," *Proceedings of the Fifth International Conference on High Performance Computing*, Chennai, India, Dec. 17-20, 1998.

Agarwal, A. et. al., "The Raw Compiler Project," *Proceedings of the Second SUIF Compiler Workshop*, Stanford, CA, Aug. 21-23, 1997.

Taylor, Michael Bedford et. al., "Scalar Operand Networks," *IEEE Transactions on Parallel and Distributed Systems (Special Issue on On-Chip Networks)*, Feb. 2005.

Taylor, Michael. The Raw Prototype Design Document V5.01 [online]. Department of Electrical Engineering and Computer Science, Massachusetts Institute of Technology, Sep. 6, 2004 [retrieved on Sep. 25, 2006]. Retrieved from the Internet: <ftp://ftp.cag.lcs.mit.edu/pub/raw/documents/RawSpec99.pdf>.

Moritz, Csaba Andras et. al., "Hot Pages: Software Caching for Raw Microprocessors," *MIT/LCS Technical Memo LCS-TM-599*, Aug. 1999.

\* cited by examiner

MANAGING BUFFER STORAGE IN A PARALLEL PROCESSING ENVIRONMENT

CROSS-REFERENCE TO RELATED APPLICATIONS

This application claims the benefit of U.S. Provisional Application No. 60/665,563 filed Mar. 25, 2005, and U.S. Provisional Application No. 60/750,149 filed Dec. 13, 2005, both of which are incorporated herein by reference.

This application is also related to U.S. application Ser. No. 11/313,900, titled "BUFFERING DATA IN A PARALLEL PROCESSING ENVIRONMENT," U.S. application Ser. No. 11/314,254, titled "MANAGING DATA FLOWS IN A PARALLEL PROCESSING ENVIRONMENT," U.S. application Ser. No. 11/314,861, titled "TRANSFERRING DATA IN A PARALLEL PROCESSING ENVIRONMENT," U.S. application Ser. No. 11/313,895) titled "FLOW CONTROL IN A PARALLEL PROCESSING ENVIRONMENT," each of which is being filed concurrently with the present application, and each of which is also incorporated herein by reference.

BACKGROUND

The invention relates to integrated circuits, and more particularly to managing buffer storage in a parallel processing environment.

FPGAs (Field Programmable Gate Arrays) and ASICs (Application Specific Integrated Circuits) are two exemplary approaches for implementing customized logic circuits. An ASIC is designed for a specific application. The cost of building an ASIC includes the cost of verification, the cost of physical design and timing closure, and the NRE (non-recurring costs) of creating mask sets and fabricating the ICs. Due to the increasing costs of building an ASIC, FPGAs became popular in the late 1990's. Unlike an ASIC, an FPGA is reprogrammable, in that it can be reconfigured for each application. Similarly, as protocols change, an FPGA design can be changed even after the design has been shipped to customers, much like software can be updated. However, FPGAs are typically more expensive, often costing 10 to 100 times more than an ASIC. FPGAs are typically power hungry and their performance can be 10 to 20 times worse than that of an ASIC.

The MIT Raw integrated circuit design is an example of a tiled integrated circuit with a computational substrate that provides reconfigurability of an FPGA along with the performance and capability of an ASIC, described, for example, in "Baring It All to Software: RAW Machines" IEEE Computer, September 1997, pp. 86-93.

SUMMARY

In one aspect, in general, the invention features an integrated circuit including a plurality of tiles. Each tile comprises a processor; a switch including switching circuitry to forward data words over data paths from other tiles to the processor and to switches of other tiles; and memory coupled to the switch to buffer data transmitted among the tiles. The switches form a plurality of networks among the tiles. At least one of the networks is configured to transmit data among the tiles using an approach that reserves sufficient buffer space in the memories coupled to the switches to avoid deadlock conditions, and at least one of the networks is configured to transmit data among the tiles using an approach to detect and recover from deadlock conditions.

This aspect of the invention can include one or more of the following features.

At least one of the networks that transmits data among the tiles using an approach to avoid deadlock conditions is configured to provide separate buffer space in the memory coupled to the switches for data transmitted over different logical channels.

At least one of the networks configured to transmit data among the tiles using an approach to avoid deadlock conditions is configured to use credit based flow control.

At least one of the networks configured to transmit data among the tiles using an approach to avoid deadlock conditions is configured to provide separate physical channels between tiles for request data and response data.

At least two of the networks are configured to transmit data among the tiles using an approach to detect and recover from deadlock conditions.

In another aspect, in general, the invention features a method for transmitting data in an integrated circuit, the integrated circuit comprising a plurality of tiles, each tile comprising a processor, a switch including switching circuitry to forward data over data paths from other tiles to the processor and to switches of other tiles, and memory coupled to the switch to buffer data transmitted among the tiles. The method includes transmitting data among the tiles using an approach that reserves sufficient buffer space in the memories coupled to the switches to avoid deadlock conditions; and transmitting data among the tiles using an approach to detect and recover from deadlock conditions.

This aspect of the invention can include one or more of the following features.

At least one of the networks that transmits data among the tiles using an approach to avoid deadlock conditions is configured to provide separate buffer space in the memory coupled to the switches for data transmitted over different logical channels.

Transmitting data among the tiles using an approach to avoid deadlock conditions includes using credit based flow control.

Using credit based flow control comprises selecting an outstanding unacknowledged data credit limit to reserve sufficient buffer space in the memories coupled to the switches to avoid deadlock conditions.

Transmitting data among the tiles using an approach to avoid deadlock conditions includes providing separate physical channels between tiles for request data and response data.

Recovering from deadlock conditions in a first network includes transmitting data among the tiles over a second network using an approach to avoid deadlock conditions.

Aspects of the invention can have one or more of the following advantages.

Switches in the tiles of the tiled integrated circuit form networks among the tiles. At least one network is configured to transmit data among the tiles using an approach that reserves sufficient buffer space in the memories coupled to the switches to avoid deadlock conditions. This network provides a deadlock free path to an external memory source for the tiles. Other networks can then transmit data among the tiles using an approach to detect deadlock conditions, and recover from the deadlock conditions using the deadlock free path to external memory.

Other features and advantages of the invention will become apparent from the following description, and from the claims.

DESCRIPTION

1 Tiled Circuit Architecture Overview

Figure 1:
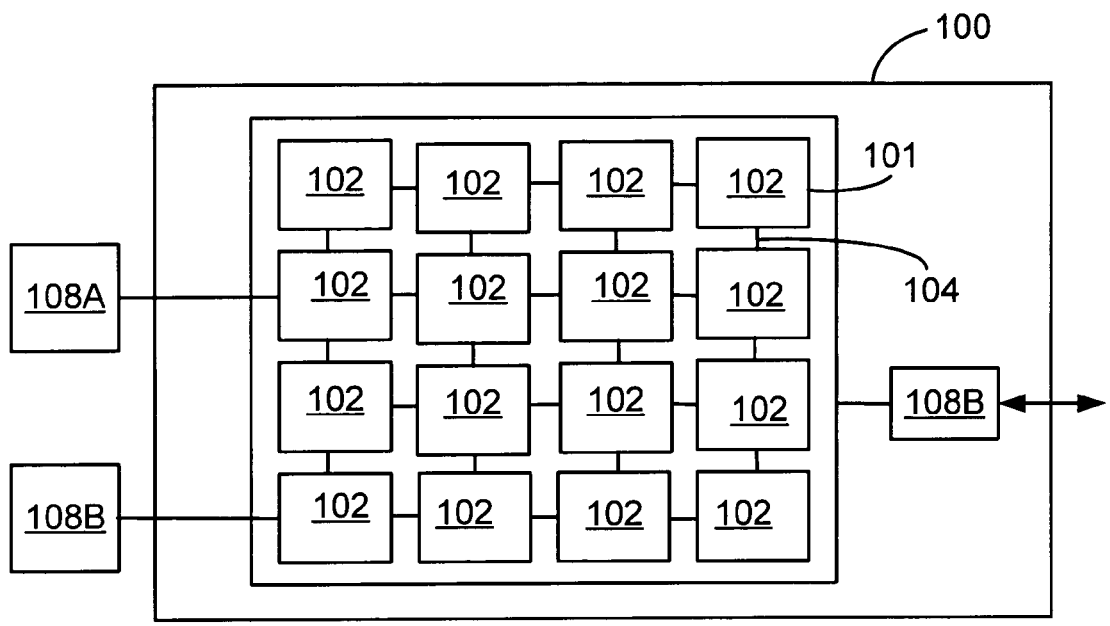
FIG. 1 is a block diagram of a tiled integrated circuit.

Referring to FIG. 1, an integrated circuit 100 (or "chip") includes an array 101 of interconnected tiles 102. Each of the tiles 102 is a functional unit that includes a processor and a switch that forwards data from other tiles to the processor and to switches of other tiles over data paths 104. The switch is coupled to the processor so that data can be sent to or received from processors of other tiles. The integrated circuit 100 includes other on-chip circuitry such as input/output (I/O) interface circuitry to couple data in and out of the circuit 100, and clock distribution circuitry to provide clock signals to the processors of the tiles.

The integrated circuit 100 shown in FIG. 1 includes a two-dimensional array 101 of rectangular tiles with data paths 104 between neighboring tiles to form a mesh network. The data path 104 between any two tiles can include multiple wires to support parallel channels in each direction. Optionally, specific sets of wires between two tiles can be dedicated to different mesh networks that can operate independently. Alternative network configurations include networks having paths that extend to diagonal neighbors or to tiles that are multiple rows or columns away. Other configurations include higher dimensional mesh topologies. For example, multiple layered integrated circuits or other three-dimensional configurations can be used to form networks in which the connections form a cube of network nodes.

The data paths 104 from one or more tiles at the edge of the network can be coupled out of the array of tiles 101 (e.g., over I/O pins) to an on-chip device 108A, an off-chip device 108B, or a communication channel interface 108C, for example. Multiple wires of one or more parallel channels can be multiplexed down to a fewer number of pins or to a serial channel interface. For example, the wires for one or more channels can be multiplexed onto a high-speed serial link (e.g., SerDes, SPIE4-2, or SPIE5) or a memory controller interface (e.g., a memory controller for DDR, QDR SRAM, or Dynamic RAM). The memory controller can be implemented off-chip or in logic blocks within a tile or on the periphery of the integrated circuit 100.

The following exemplary implementations are described in the context of tiles that have the same structure and functionality. Alternatively there can be multiple "tile types" each having different structure and/or functionality. For example, tiles that couple data off of the integrated circuit 100 can include additional circuitry for I/O functions.

Figure 2A:
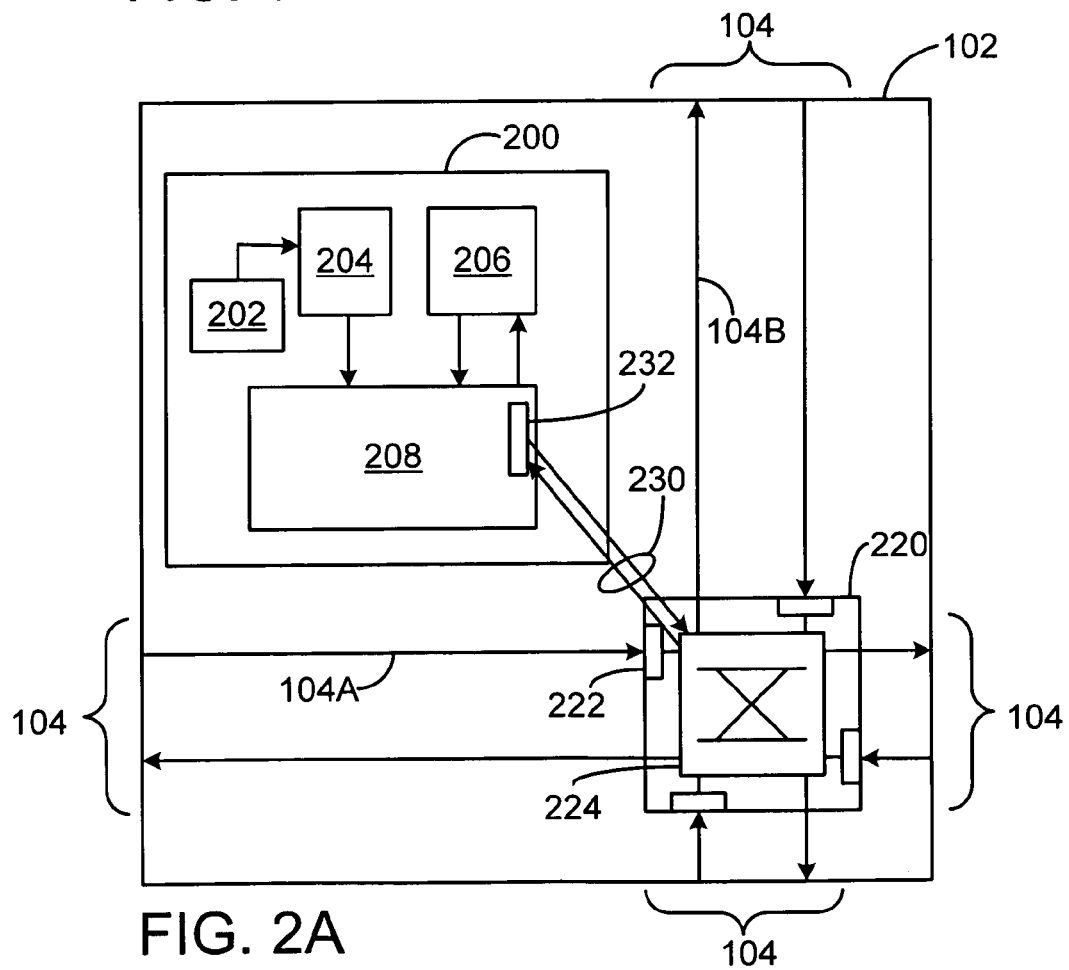
FIG. 2A is a block diagram of a tile.

Referring to FIG. 2A, a tile 102 includes a processor 200, a switch 220, and sets of incoming wires 104A and outgoing wires 104B that form the data paths 104 for communicating with neighboring tiles. The processor 200 includes a program counter 202, an instruction memory 204, a data memory 206, and a pipeline 208. Either or both of the instruction memory 204 and data memory 206 can be configured to operate as a cache for off-chip memory. The processor 200 can use any of a variety of pipelined architectures. The pipeline 208 includes pipeline registers, functional units such as one or more arithmetic logic units (ALUs), and temporary storage such as a register file. The stages in the pipeline 208 include, for example, instruction fetch and decode stages, a register fetch stage, instruction execution stages, and a write-back stage. Whether the pipeline 208 includes a single ALU or multiple ALUs, an ALU can be "split" to perform multiple operations in parallel. For example, if the ALU is a 32-bit ALU it can be split to be used as four 8-bit ALUs or two 16-bit ALUs. The processor 200 can include other types of functional units such as a multiply accumulate unit, or a vector unit. The processor 200 can be multithreaded and/or have capabilities of a Very Long Instruction Word (VLIW) processor, a superscalar processor, or a vector processor.

The switch 220 includes input buffers 222 for temporarily storing data arriving over incoming wires 104A, and switching circuitry 224 (e.g., a crossbar fabric) for forwarding data to outgoing wires 104B or the processor 200. The input buffering provides pipelined data channels in which data traverses a path 104 from one tile to a neighboring tile in predetermined number of clock cycles (e.g., a single clock cycle). This pipelined data transport enables the integrated circuit 100 to be scaled to a large number of tiles without needing to limit the clock rate to account for effects due to wire lengths such as propagation delay or capacitance. (Alternatively, the buffering could be at the output of the switching circuitry 224 instead of, or in addition to, the input.)

1.1 Switch Operation

A tile 102 controls operation of a switch 220 using either the processor 200, or separate switch processor dedicated to controlling the switching circuitry 224. Separating the control of the processor 200 and the switch 220 allows the processor 200 to take arbitrary data dependent branches without disturbing the routing of independent messages passing through the switch 220.

In some implementations, the switch 220 includes a switch processor that receives a stream of switch instructions for determining which input and output ports of the switching circuitry to connect in any given cycle. For example, the switch instruction includes a segment or "subinstruction" for each output port indicating to which input port it should be connected. In other implementations, the processor 200 receives a stream of compound instructions with a first instruction for execution in the pipeline 208 and a second instruction for controlling the switching circuitry 224.

The switch instructions enable efficient communication among the tiles for communication patterns that are known at compile time. This type of routing is called "static routing." An example of data that would typically use static routing are operands of an instruction to be executed on a neighboring processor.

The switch 220 also provides a form of routing called "dynamic routing" for communication patterns that are not necessarily known at compile time. In dynamic routing, circuitry in the switch 220 determines which input and output ports to connect based on header information in the data being dynamically routed. A tile can send a message to any other tile by generating the appropriate address information in the message header. The tiles along the route between the source and destination tiles use a predetermined routing approach (e.g., shortest Manhattan Routing). The number of hops along a route is deterministic but the latency depends on the congestion at each tile along the route. Examples of data traffic that would typically use dynamic routing are memory access traffic (e.g., to handle a cache miss) or interrupt messages.

The dynamic network messages can use fixed length messages, or variable length messages whose length is indicated in the header information. Alternatively, a predetermined tag can indicate the end of a variable length message. Variable length messages reduce fragmentation.

The switch 220 can include dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

As described above, the switch 220 is coupled to the processor 200 over processor coupling wires 230. For fast (e.g., low latency) communication between tiles of neighboring processors, the coupling wires 230 can be integrated directly into the pipeline 208. The processor 200 can communicate with the switch 220 using distinct opcodes to distinguish between accesses to the static and dynamic network ports. Alternatively, the instructions can use register names to refer to switch ports.

For example, the processor can send or receive data by writing to or reading from a register interface that is directly mapped to the input buffers 222 of the switch 220. For data going to or coming from the processor 200, a switch instruction indicates that the switch 220 should couple data to or from a selected register or bypass path of the pipeline 208 over a register mapped pipeline integrated switch interface 232. This pipeline integration allows data to be available to the switch 200 the moment an instruction is executed and the register value is available. In the next cycle the same data could appear at an input buffer of another tile.

Figure 2B:
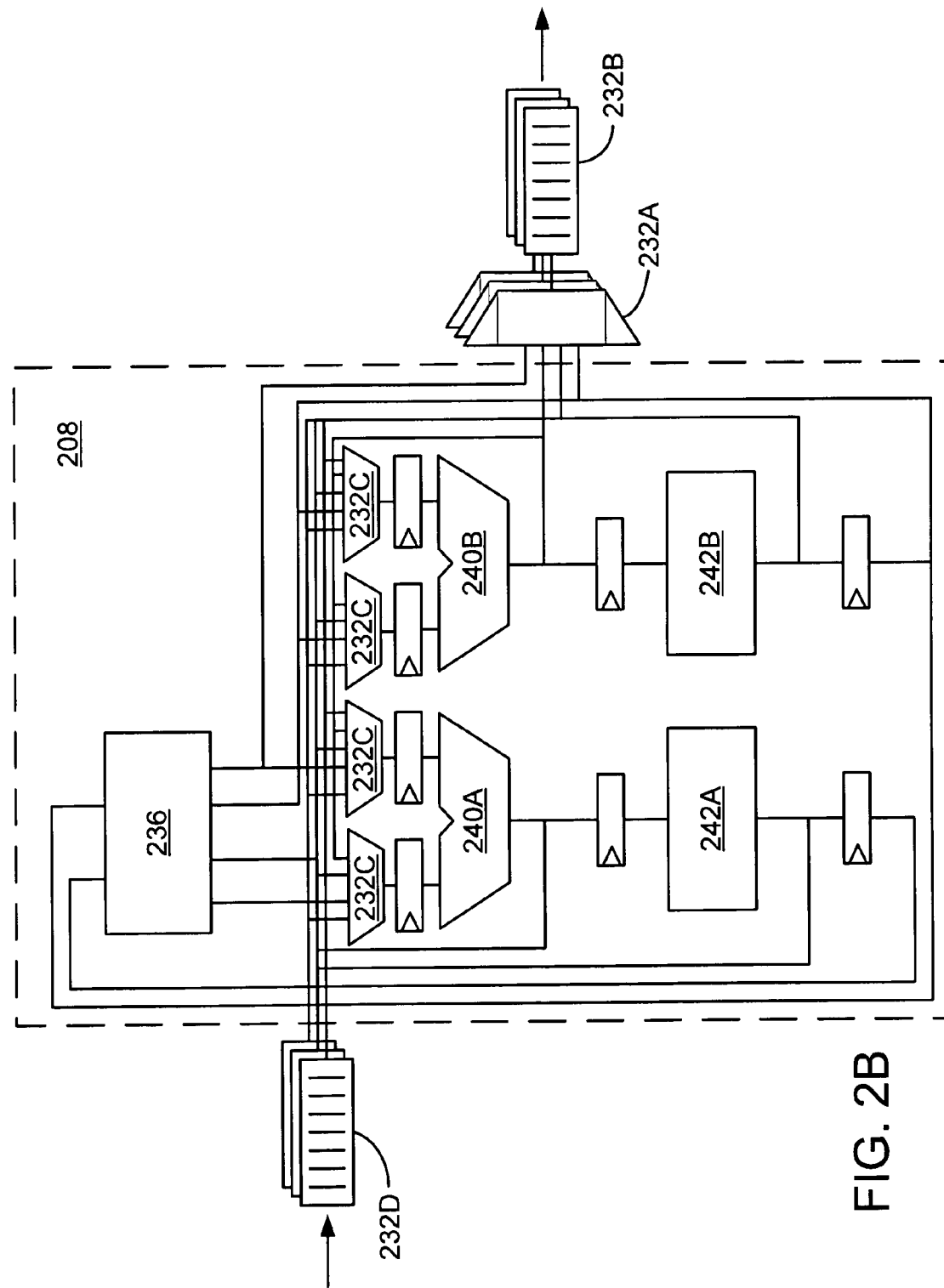
FIG. 2B is a block diagram of a pipeline.

Referring to FIG. 2B, a register mapped pipeline integrated switch interface 232 includes a set of multiplexers 232A and output buffers 232B coupled to different output ports of the static or dynamic switch. The switch interface also includes a set of multiplexers 232C that select data from a register file 236 or any of a set of input buffers 232D coupled to different input ports of the static or dynamic switch. The multiplexers 232C feed the inputs to logic units 240A and 240B. The output buffers 232B and input buffers 232D are mapped to the name space of the register file 236. When the processor 200 reads from a register name mapped to a given switch port, data is taken from the corresponding input buffer 232D. When the processor 200 writes to a register name mapped to a given switch port, data is inserted into the corresponding output buffer 232B. The multiplexers 232A are able to select data from any pipeline stage (e.g., before or after the logic units 240A and 240B, or before or after functional units 242A and 242B) as soon as the value is available. If the processor 200 loads an instruction to read from an empty input buffer 232D or to write to a full output buffer 232B, the processor 200 will stall until it is able to proceed.

Figure 3A:
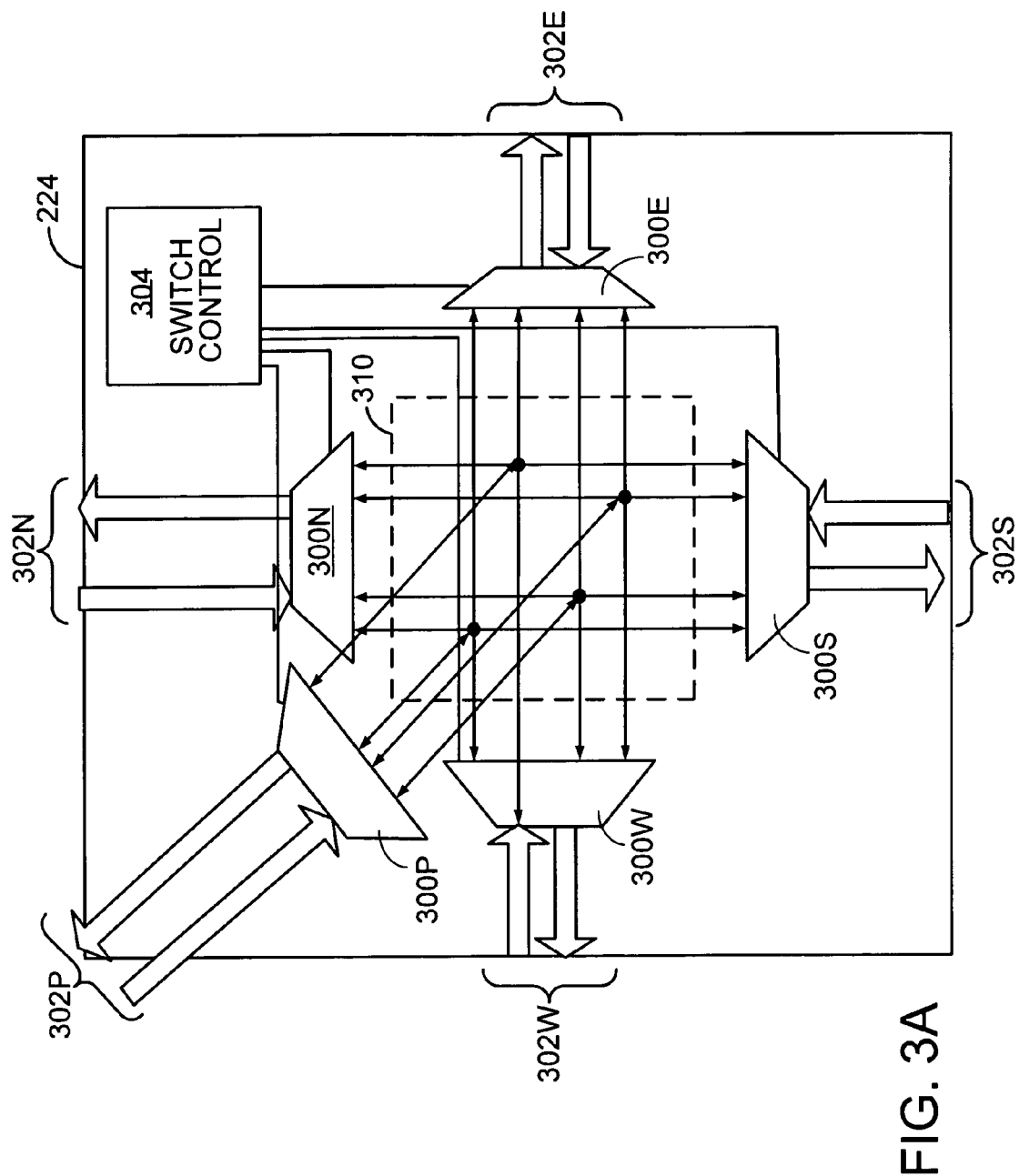
FIGS. 3A-3C are block diagrams of switching circuitry.

Referring to FIG. 3A, switching circuitry 224A includes five multiplexers 300N, 300S, 300E, 300W, 300P for coupling to the north tile, south tile, east tile, west tile, and local processor 200, respectively. Five pairs of input and output ports 302N, 302S, 302E, 302W, 302P are connected by parallel data buses to one side of the corresponding multiplexer. The other side of each multiplexer is connected to the other multiplexers over a switch fabric 310. In alternative implementations, the switching circuitry 224 additionally couples data to and from the four diagonally adjacent tiles having a total of 9 pairs of input/output ports. Each of the input and output ports is a parallel port that is wide enough (e.g., 32 bits wide) to couple a data word between the multiplexer data bus and the incoming or outgoing wires 104A and 104B or processor coupling wires 230.

A control module 304 selects which input port and output port are connected in a given cycle. The routing performed by the control module 304 depends on whether the switching circuitry 224 is part of the dynamic network or static network. For the dynamic network, the control module 304 includes circuitry for determining which input and output ports should be connected based on header information in the incoming data.

Figure 3B:
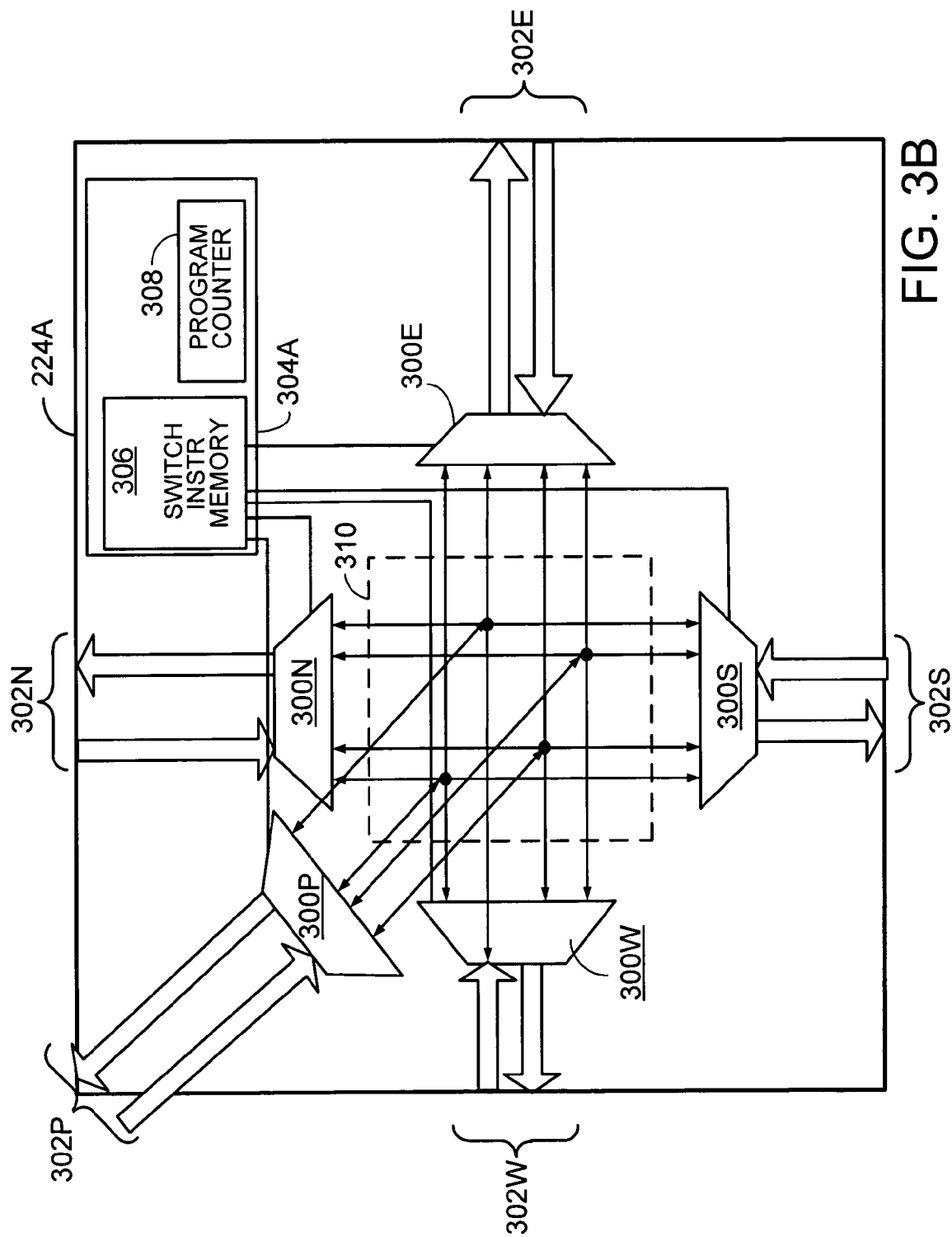

Referring to FIG. 3B, for the static network, the control module 304A of switching circuitry 224A includes a switch instruction memory 306 storing switch instructions that indicate which input and output ports should be connected. A switch instruction stored in the switch instruction memory 306 includes a subinstruction for each output port (in this case, five subinstructions). Each subinstruction represents a multiplexer select value which routes one of five input ports to the corresponding output port.

A program counter 308 steps through the switch instructions, interpreting control information (e.g., a condition code) in the switch instructions to perform actions such as branches or jumps based on program control flow. In a given clock cycle, the control module 304A can enable the multiplexers to move data independently onto any output port from any input port, including multicasting an input port to all output ports, as long as two input ports are not connected to the same output port in the same clock cycle.

The control module 304A is able to function as a switch processor with or without an ALU and registers. The control module 304A can include an ALU and registers to allow in-switch processing of in-flight messages. Optionally, the control module 304A can include other components such as a floating point arithmetic unit, or bit shifter, for example, to perform additional functions. The control module 304A can also be VLIW-type processor and be multithreaded.

Figure 3C:
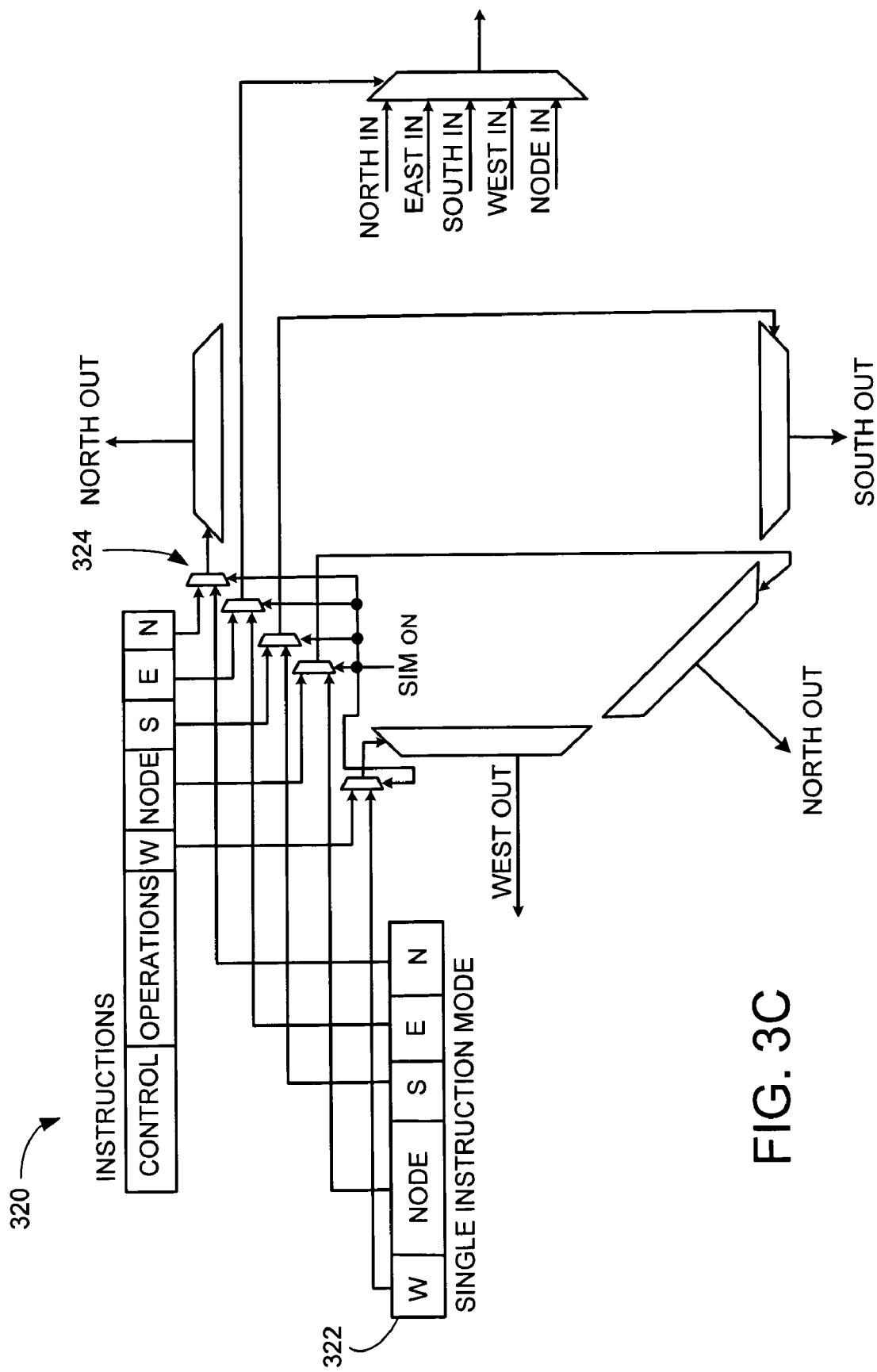

Referring to FIG. 3C, a static network switch 320 is configured in "single instruction mode." In single instruction mode, one instruction is used to control the multiplexers of the switch over many cycles. When data arrives at one switch input port, that data is routed according to the instruction stored in the single instruction buffer 322 independent of the availability of data a the other switch input ports. In this example, the switch 320 includes multiplexers 324 for turning single instruction mode on or off. The control signals for the multiplexers 324 are controlled by the processor 200 (e.g., mapped to a register name space of the processor 200).

When single instruction mode is on, data is routed according to the single instruction buffer 322. When single instruction mode is off, data is routed according to instructions in the switch instruction buffer 346. To save power in single instruction mode, switches are able to turn off circuitry such as a switch instruction fetch unit, and a switch instruction decode logic. Power can also be saved by reducing the size of the single instruction buffer 322 (e.g., to the size of a single instruction). In some implementations the size of the single instruction buffer 322 can be reduced to only enough bits to represent the coupling between the input and output ports (e.g., 2, 3, or 4 bits).

When utilizing single instruction mode, the individual output directions are independent of each other and there are no synchronization requirements. For example, if the single instruction specifies a route from north to south and a route from east to west, and data arrives on the east port, but no data arrives on the north port, the switch will route the data from east to west independent of data being available on the north or ports. With multiple static switches configured to use single instruction mode, the static network can be utilized to construct a dedicated physical channel across the integrated circuit.

The switches 220 include hardware and software mechanisms for providing flow control to ensure that data arriving at a full tile input buffer does not overwrite old data still pending in the buffer or cause deadlock. A switch 220 can include circuitry to detect full/empty states of buffers, and some of the wires in the data paths 104 of the static or dynamic network can be dedicated to communicating flow control information. In the dynamic network, the traffic patterns are unpredictable and there is a need for techniques for deadlock avoidance or deadlock detection and recovery. For example, buffers that become full can be overflowed into memory coupled to the switch 220 or the processor 200, or over one of the networks to off-chip memory. In the static network, the traffic patterns are controlled by the processing of switch instructions in a way that ensures correct delivery of data and avoids deadlock.

In a first approach to flow control for the static network, a processor 200 or switch 220 stalls if it is executing an instruction that attempts to read data from an empty input buffer 222 or from an empty processor output buffer 236, or send data to a tile with a full input buffer 222. This approach ensures correctness in the presence of timing variations introduced by dynamic events such as dynamic memory references and I/O operations.

In a second approach to flow control for the static network, the switch 220 can continue to process subinstructions of a macro switch instruction if data has arrived at the corresponding input buffers, and delay processing subinstructions if the corresponding input buffer is empty. The switch 220 is also notified that an input buffer at a connected tile that receives data from a given output port is full (e.g., via a full/empty bit). The switch 220 is able to continue processing switch instructions for other output ports while suspending only that output port.

In one implementation of this second approach, there is a switch instruction memory 306 (e.g., separate memory units or separate queues within a single memory unit) and program counter 308 for each output port to enable the switch 220 to operate independently on a separate stream of switch instructions for respective output ports. For example, the switch 220 can extract the instruction streams for respective output ports from an incoming macro switch instruction stream that includes subinstructions for the respective output ports. The condition code from a macro switch instruction can be included with each corresponding subinstruction of the extracted instruction streams. Alternatively, each subinstruction can include its own condition code based on the appropriate program logic. This second approach allows data that can be forwarded without sacrificing correctness to be forwarded without further delay.

1.2 Additional Circuitry

A tile can include additional circuitry embedded within or coupled to the processor 200 and/or switch 220. The configuration of the circuitry in a tile can be controlled by local control information stored in the tile. For example, a module in the tile can be turned on or off or configured into a variety of modes based on the state of a "mode indicator" (e.g., one or more bits) stored in a register or other memory store.

A tile 102 can include various types of memory modules to serve as the instruction memory 204, data memory 206, or as a local memory store for other types of information such as control information for the tile. There can be a small SRAM bank in each tile in addition to a large SRAM bank. There can also be a larger DRAM bank in each tile. Each tile can have mode indicators used to select among these banks. Any of the memory modules can be treated as a cache for a larger memory store outside the tile 102 or the integrated circuit 100. Such external memory (e.g., DRAM) is accessible over high bandwidth paths of one or more dynamic networks. The amount of memory can be chosen to roughly balance the areas devoted to processing and memory, and to match the memory access time and the processor clock.

A tile 102 can include Reconfigurable Logic (RL) that takes operands from registers and writes them back to registers after performing reconfigurable logic operations. The RL can be used for bit-level (or "gate-level") logic, and also for multi-bit-level (e.g., byte-level) logic. The operations performed by the RL can be specified by logic-level instructions supplied to the RL.

Functions such as virtual address translation, caching, global shared memory and memory protection can be implemented by any combination of hardware and software (e.g., processor instructions). A tile 102 can include a translation look-aside buffer (TLB) to translate virtual addresses as they come out of the processor 200 on each tile 102. A mode bit can turn off translation. The events such as cache miss or translation fault can trigger a trap or interrupt to the processor 200, so that the processor 200 can handle it in software. For example, there can be multiple trap lines to the processor 200. Alternatively, there are few trap lines, but there is a trap vector that the processor 200 can access which encodes the type of trap that occurred. There is a mode indicator which can allow selecting whether the software or the hardware handles these events. A hardware cache tag file can export a hit/miss status to the software rather than stalling the processor pipeline.

In a processor 200 in which the switch 220 is integrated into the bypass paths of the processor pipeline 208, the translation is performed before the data is sent (or committed) to the switch (e.g., before being written into a switch buffer to be sent out on any one of the static or dynamic networks). In this way, if there is a translation fault, then the data is not sent and the instruction can be safely aborted. Otherwise, data for which there has been a translation fault could corrupt program execution if sent over a network.

2 Tiled Circuit Programming Overview

A software system for the tiled integrated circuit 100 includes a compiler that is able to schedule instructions in both time and space by generating both processor and switch instructions for arranging the static network. The compiler can also prepare messages to be sent over the dynamic network. The combination of the static network and the pipeline integration enables the compiler to orchestrate a calculation to be performed over multiple tiles with fast register-level communication between tiles. The software system can exploit both coarse-grained parallelism and fine-grained Instruction-Level Parallelism (ILP). In addition, the software system can exploit reconfigurable logic in each tile to construct operations that are uniquely suited for a particular application. This reconfigurable logic can be coded in a hardware description language such as Verilog or VHDL, or in a high-level language such as C.

The operating system (OS) for the integrated circuit 100 can include a Linux-like kernel or a similar kernel running on a single tile 102. Alternatively, the OS can be a distributed OS running on multiple tiles sending messages to each of the processes on each of the tiles.

The compiler can leverage the architectural features of the integrated circuit 100 by partitioning and scheduling ILP or data-level parallelism across the tiles. The compiler is able to automatically parallelize sequential applications across multiple tiles 102. For example, outer loops can be parallelized at a coarse-grained while inner loops can be parallelized at a fine grain, much as in a vectorizing compiler. When the compiler can identify commonly occurring instruction patterns or bit operations, they can be configured into special operations that will run in a single cycle using the reconfigurable logic.

Figure 4:
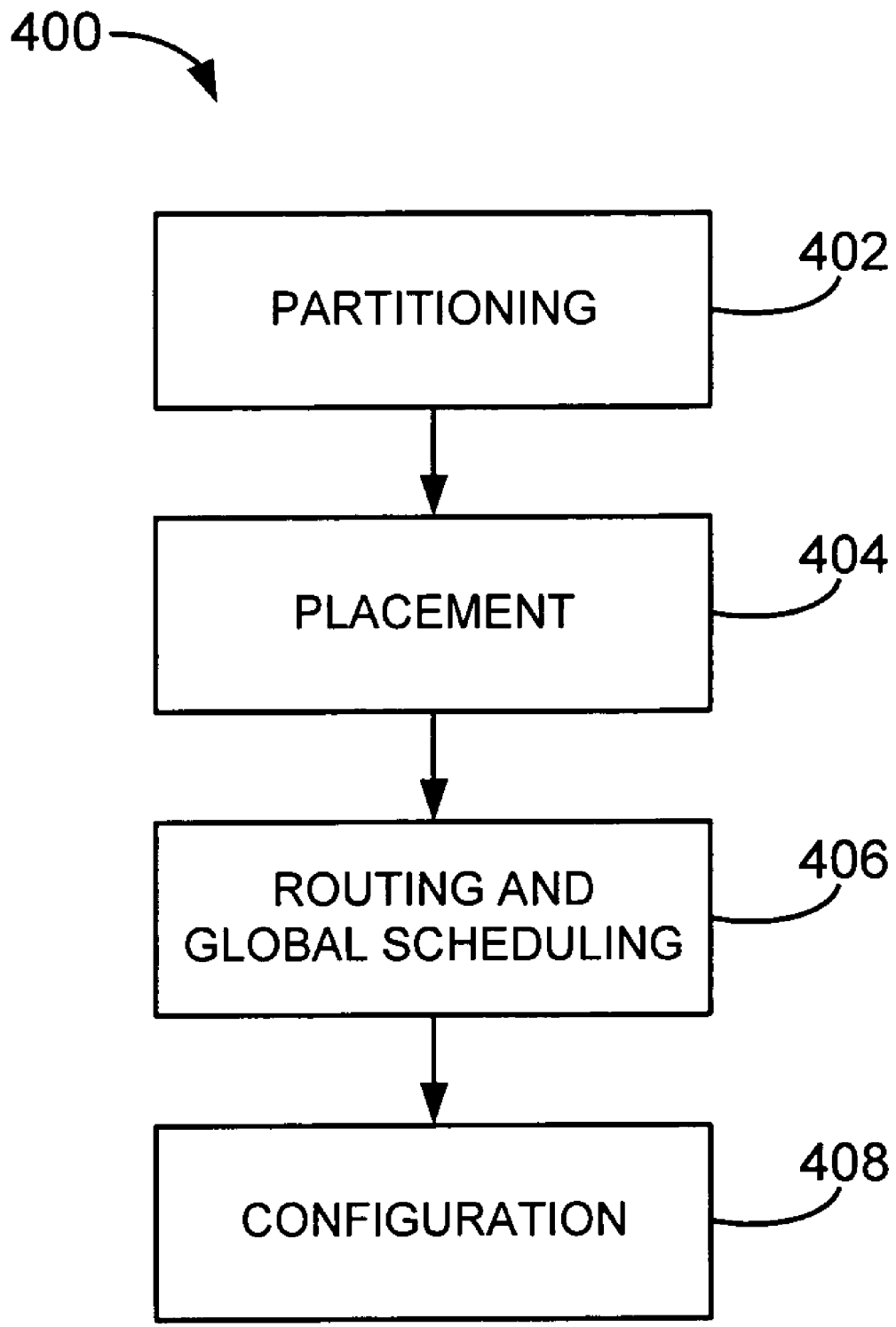
FIG. 4 is a flowchart for a compiling process.

Referring to FIG. 4, a compiling process 400 includes a number of stages. The compiler identifies and partitions for fine grain ILP in program by balancing the benefits of parallelism versus the overheads of communication and synchronization. In a partitioning phase 402, the compiler generates parallel code for a number of threads up to the number of tiles in the integrated circuit 100. In the partitioning phase 402, the compiler assumes an idealized fully-connected switch (an "ideal crossbar"), an unbounded number of virtual registers per tile, and symbolic data references. In a placement phase 404, the compiler removes the idealization of an ideal crossbar by selecting a one-to-one mapping from threads to physical tiles. The placement algorithm attempts to minimize a latency and bandwidth cost measure and can be, e.g., a variant of a VLSI cell placement algorithm. In a routing and global scheduling phase 406, the compiler allocates physical network resources with the goal of minimizing the overall estimated completion time of the program. The compiler output includes a program (e.g., a stream of instructions) for the processor 200 of each participating tile.

In an optional configuration phase 408, the compiler selects an application-specific configuration for reconfigurable logic to perform one or more custom operation. For each custom operation, the configuration compiler generates logic-level instructions for the reconfigurable logic and if necessary rewrites associated processor or switch instructions. For example, a compound operation involving multiple instructions is replaced by a call to the appropriate custom instruction using the reconfigurable logic. The compiler output includes a program (e.g., a stream of instructions) for each tile processor 200 and switch 220, and optional logic-level instructions.

Alternatively, the compiler can generate logic-level instructions based on a separate hardware description language program, as described in more detail below.

3 Additional Features 3.1 Operand Decoupling

As described above, in a first approach to flow control for the static network, a processor 200 or switch 220 stalls until all data to be switched according to a macro switch instruction become available before they are forwarded to their respective output ports. This approach can cause starvation at some ports where data, such as an operand for a processor instruction to be executed in another tile, is available but is not able to make forward progress.

Under certain circumstances, it is a better to allow the input port (or output port) buffers to be decoupled from each other so that each output port can route an operand as soon as the operand is available. As described above, in a second approach to flow control for the static network, there is a switch instruction memory 306 and program counter 308 for each output port to enable the switch 220 to operate independently (e.g., at different rates) on a separate stream of switch instructions for respective output ports.

Under other circumstances, it is dangerous to allow an operand to be allowed to be routed without all operands to be available for all output ports. In certain of these dangerous scenarios, the program order can be violated if operands are allowed to bypass each other, resulting in faulty program execution. This is particularly true when running programs compiled using an ILP compilation strategy. In ILP compilation, individual instructions that can run in parallel are executed in different tiles, and operand values are communicated between tiles. The order in which operand values reach input buffers is critical to the correctness of the program. Often, only the compiler can make such a determination at compile time.

One way to solve this problem is to enable the switch 220 to operate in an "operand decoupling mode" in which the switch instruction streams are processed synchronously. For example, the mode can be controlled using a mode indicator called the Operand Decoupling mode indicator (or the OD mode indicator) that allows the switch 220 to decouple the input buffers in a switch from each other. If this mode indicator is set, then the input buffers are decoupled, and the switch 220 will allow the operands to pass each other. For example, in a group of operands that have been scheduled by the compiler to be switched at the same time (e.g., in the same cycle), some of the operands can be switched before others. If the bit is not set, then the switch 220 processes switch instructions synchronously (in "coupled mode"), stalling if necessary until all operands scheduled to be switched together are available in the input buffers.

The switch 220 (or processor 200) can set the OD mode indicator based on the presence or absence of a tag in the operands. The compiler tags operands that must all appear at the switch input buffers before any is routed with a tag (e.g., a "sequence tag"). All operands that have been tagged as a group have to become available before any is allowed to proceed. The OD mode indicator can be set (directly, or in response to a sequence tag in the data) by an application, by the compiler, by the firmware implemented on the chip, or by a user. The OD mode indicator can also be set over a network (e.g., via the dynamic network). The OD mode indicator can be set once at the beginning of execution, or at the time of shipment of the chip, or at the time of shipment of the system in which the chip is embedded. An OD mode indicator can be provided per switch, per tile, or for the entire chip.

3.2 Pipeline Integration

Bypass paths in pipelines short circuit values from one pipeline stage to another without the need to transmit the values to the register file or to memory each time. The bypass paths in a processor are thus critical resources for shuttling values around between various stages such as ALUs, register files, load-store queues, writeback stages, and so on. As described above, a register mapped interface is able to integrate the switch 220 into the bypass paths of the processor pipeline 208. Register mapped interfaces allow the processor 200 to use register names to refer to buffers that couple data into or out of the static or dynamic networks. Values may be coupled from a processor bypass path to a switch output port, or values may be read from the switch into the processor bypass paths.

Integration of the switch 220 into the bypass paths of the pipeline 208 enables the values that are destined to the switch 220 from the processor 200 to be picked directly from the processor pipeline 208 as soon as they are produced. For example, data values from the pipeline 208 can be sent to switch buffers 232B directly from the processor's bypass paths, even before the values are written to the register file 236 (FIG. 2B) at a writeback stage.

If values going to the network are ordered, care should be taken when choosing which value to forward to the network in any given cycle. If "long-latency" instruction that requires the whole pipeline to compute writes to the network, and it is followed by a "short-latency" instruction that also writes to the network, but requires fewer pipeline stage to compute, then to preserve ordering of values to the network, the value from the short-latency instruction is delayed from reaching the network until the long-latency instruction has written to the network. Control logic is used to determine which value in the pipeline that targets the network is the oldest to preserve ordering of values going to the network. It is possible to use a reordering buffer or a unordered network to relax this strict ordering requirement.

The pipeline integrated switch enables a value computed by an ALU of a given tile to be used as an operand in a neighboring tile's ALU with extremely low latency, e.g., in 1 to 3 cycles, as opposed to 5 or 10 cycles, which would be the case if the value was picked from the pipeline in the writeback stage of the pipeline. This low latency transfer of single word operands between tiles is an important aspect of enabling an ILP (instruction level parallelism) compiler to compile programs written in sequential C, C++ or other high level languages to multiple tiles.

Register file size can be increased from the size used by other processors (which may have 8 to 32 registers), for example, to 64 or more registers, because some of the register name space is used up to name switch buffers.

In VLIW processors, multiple subinstructions in a macroinstruction may attempt to read or write to the switch buffers. If multiple subinstructions in a macroinstruction try to write to a register name mapped to the same switch buffer, there is a conflict. The compiler avoids such conflicts in scheduling the VLIW instructions. Alternatively, hardware can be present in the tile to serialize the two writes into the switch buffers allowing both to take place sequentially without a conflict. Multiple instructions in a macroinstruction are able to read from the same switch buffer without a conflict.

When an outgoing value is coupled from the processor 200 to the switch 220, the processor instruction may include a switch register specifier denoting one of several output registers. The specified output register may be linked to a static coupled switch (with the OD mode indicator set to coupled mode), a static decoupled switch (with the OD mode indicator set to operand decoupling mode), or to a dynamic network switch.

For increased speed, the switch register specifier is able to directly specify a register of a neighboring processor. A direct name identifying the register can be included, or there can be a directional mode indicator in the instruction that allows the register name to be interpreted based on the name space of a neighboring tile. For example, a directional mode indicator can be 2 bits corresponding to a register in a tile in the east, west, north, or south direction. Directional mode indicators allow the name space of a register specifier to be inferred to be that of a neighboring tile. Particularly for a slow clocked system, it is useful to avoid a multi-hop near neighbor latency by using a directional mode indicator to enable a single-hop communication event from one tile to a neighboring tile.

Alternatively, instead of sending a processor value to a register on the same tile using a register specifier, or to a neighboring or other tile's register or ALU, a processor value can be sent to a memory using a memory specifier, or to an I/O port using an I/O specifier.

When an incoming value is coupled from the switch to the processor, the processor instruction may include a register specifier denoting one of several input registers from the switch. These input registers serve to synchronize the processor pipeline with the switch even if the switch is running in decoupled mode. There can be more input ports than just the 4 directions (north, south, east, and west). For example, there can be multiple networks, and there can also be communication paths forming "hyperlinks" that skip multiple tiles.

Another mode indicator called the Processor Switch Coupling (PSC) mode indicator indicates whether program counters of the processor 200 and switch 220 are to be coupled. If this PSC mode indicator is set, the processor and the switch program counters are coupled and the two are incremented synchronously. For example, both the processor and switch pipelines are stalled if either is stalled.

It is useful for some of these mode indicators, in particular, the directional mode indicators, to be linked to the clock speed of the integrated circuit 100. For example, a given mode may be more appropriate for a given clock speed. In some cases, a tile is allowed to transfer data over hyperlinks to non-neighbor processors (e.g., by allowing a compiler to have visibility of the hyperlinks) only when the clock speed is lower than a predetermined rate. This is because hyperlinks to tiles, which are normally two or more hops away in a two dimensional (east, west, south, north) mesh network, will traverse longer data paths. Data that traverses a longer data path will take longer to reach its destination. Therefore, in some cases, these longer delays limit the integrated circuit 100 to operating with slower clock speeds when hyperlinks are used than the clock speeds that may be available when hyperlinks are not used. In some implementations, the clock speed of the integrated circuit 100 is itself controlled by one or more mode indicators.

3.3 Reconfigurable Logic

As described above, a tile 102 can include Reconfigurable Logic (RL) that is able to perform reconfigurable bit-level (or "gate-level") logic operations or multi-bit-level logic operations. RL enables each tile to have highly dense logic implemented in an energy efficient manner. For example, logic operations can be performed to implement functions such as memory controllers in the tiles without needing to expend many cycles to perform simple bit-level logic operations such bit shifts. The RL enables the integrated circuit 100 to perform more logic operations in a single clock cycle in a way that is selectable at compile time by a user or in a way that is customizable to an application. FIGS. 5A-5F show exemplary configurations for including RL 500 in a tile 102.

Figure 5A:
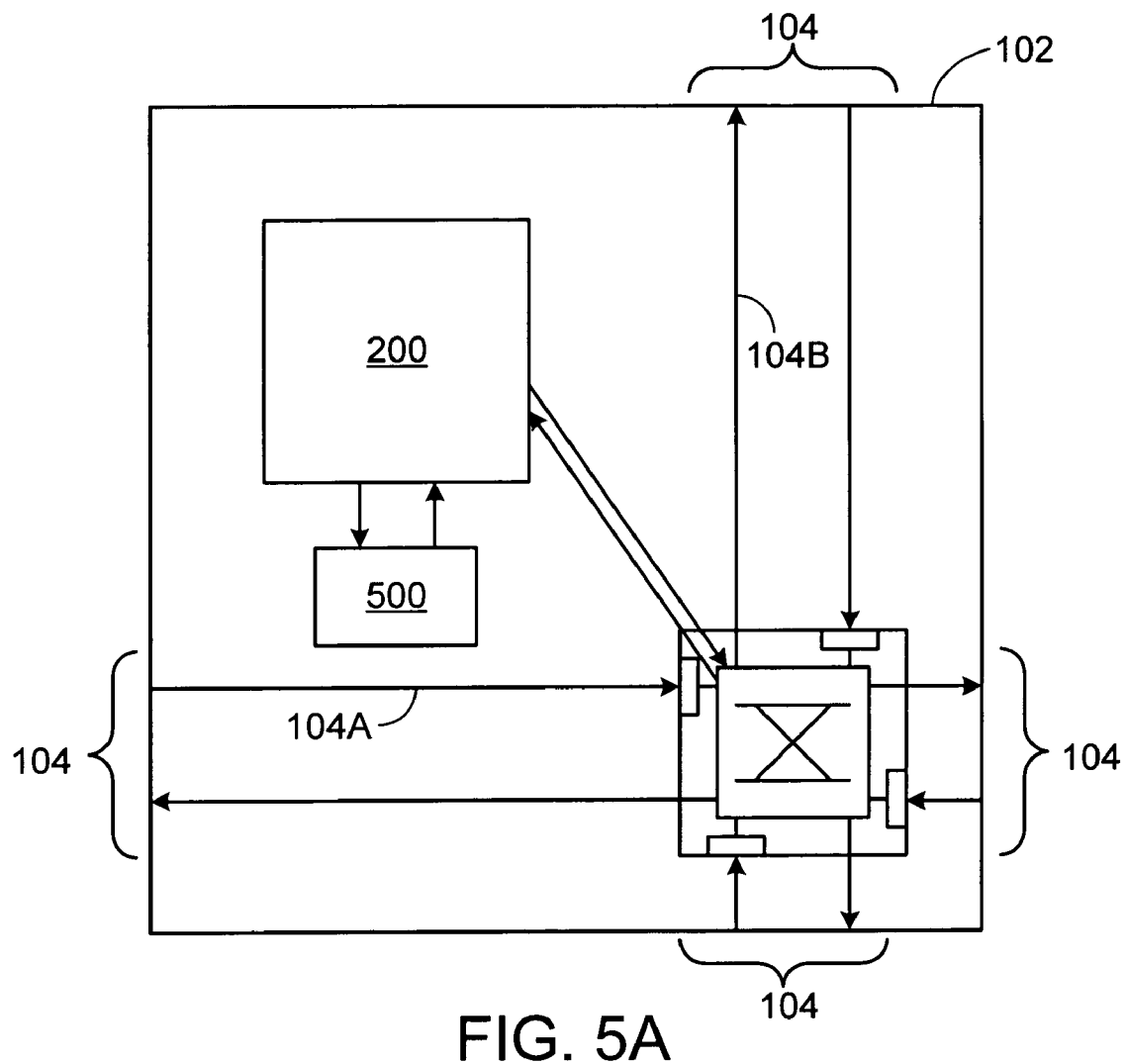
FIGS. 5A-5F are block diagrams showing reconfigurable logic in the integrated circuit.

Referring to FIG. 5A, the RL 500 is an adjunct to the processor 200. In this configuration, a user may define special instructions in a hardware description language (e.g., verilog) for the RL 500. The RL 500 is able to operate on a value from a register in the processor 200 and write the result back into a register in the processor 200.

Figure 5B:
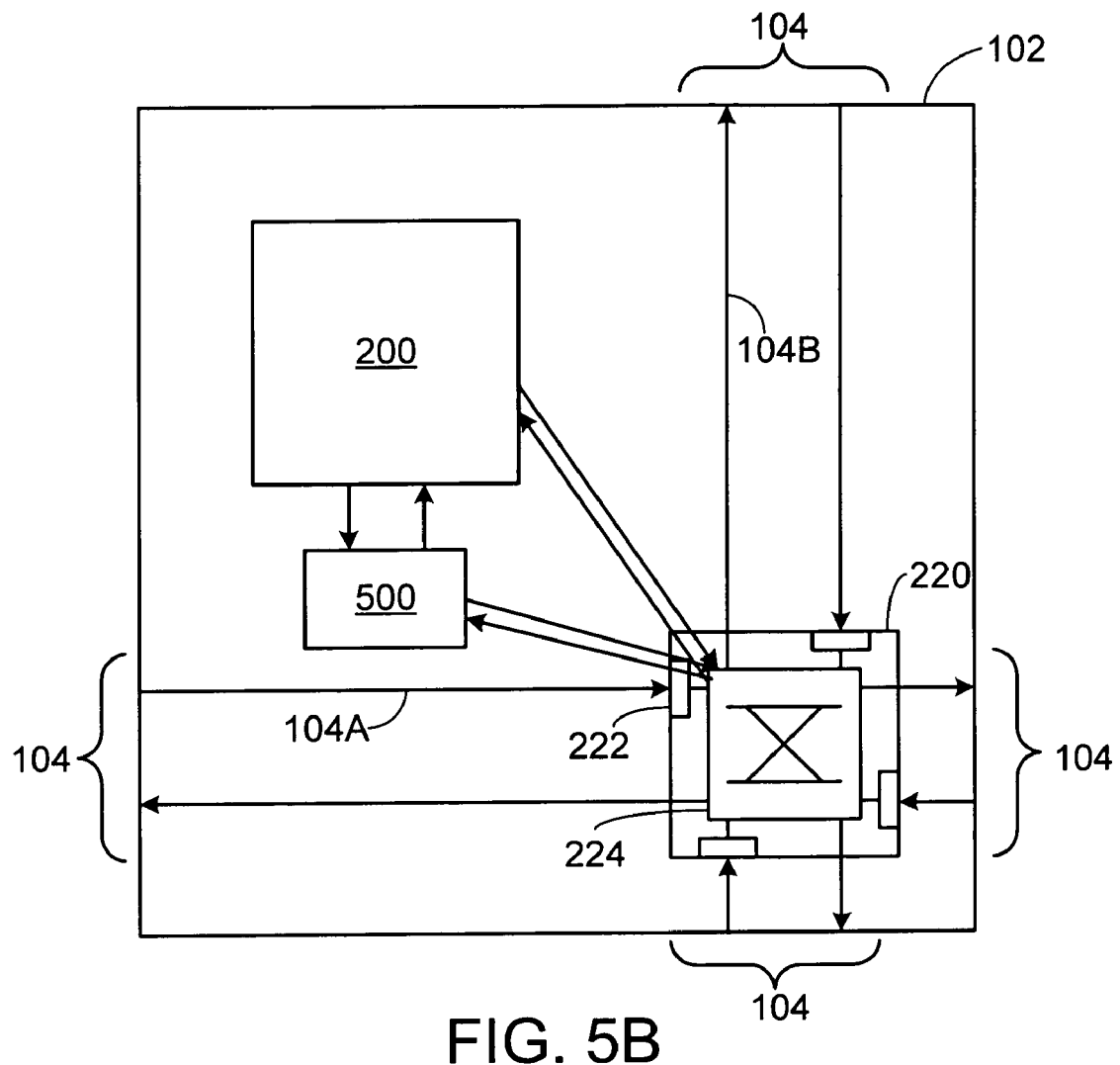

Referring to FIG. 5B, the RL 500 includes one or more connections to the switch 220. The connections can include independent bit-level connections. Through the switch 220, the RL 500 is able to connect to RL of other tiles, so that the RL in multiple switches can be "ganged together" to perform operations cooperatively. The RL 500 can also include connections to the processor 200. The connections between the RL 500 and the RL of other tiles can go through pipeline registers and multiplexers so that the compiler software can orchestrate the RL operations.

Figure 5C:
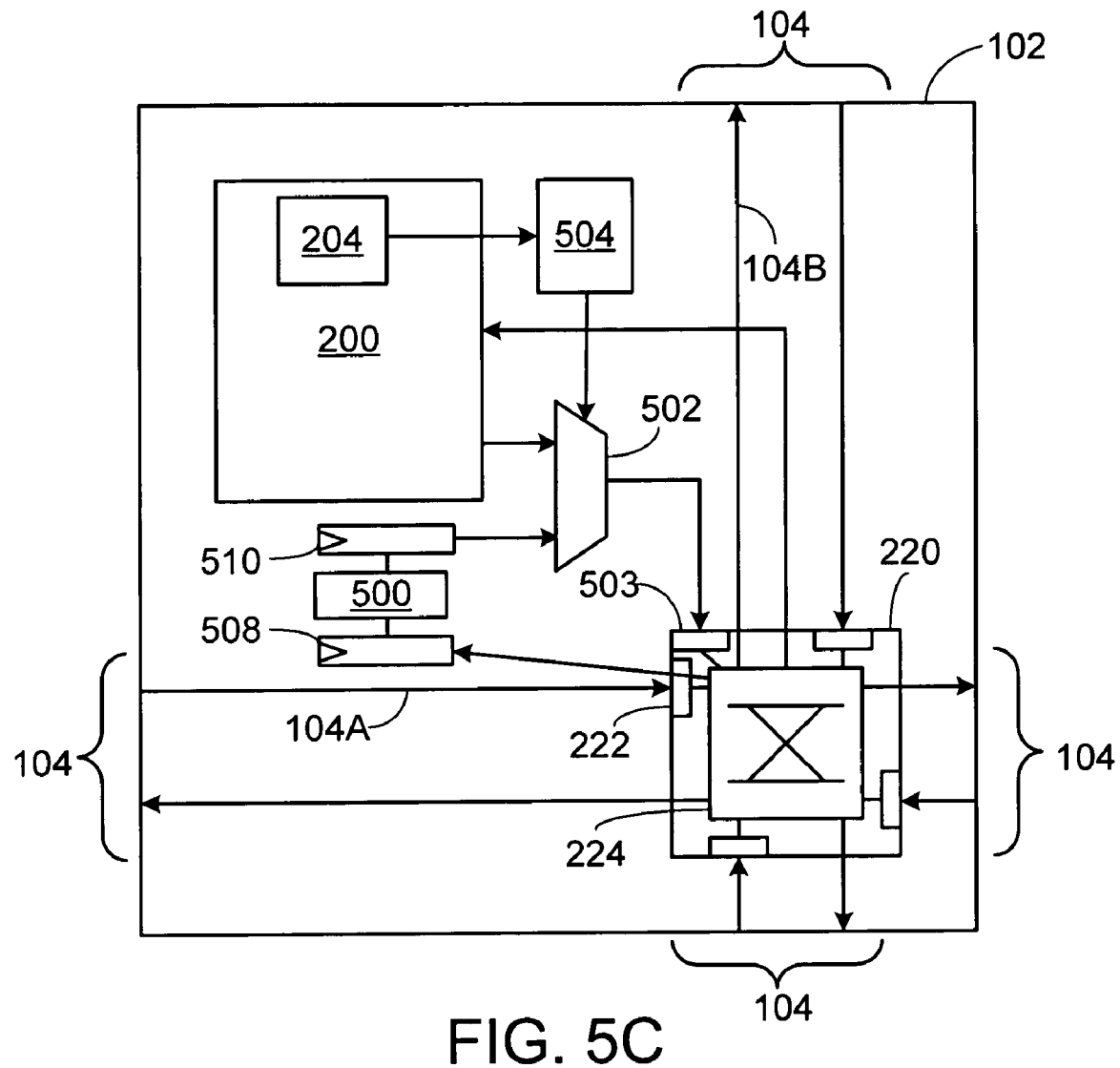

Referring to FIG. 5C, the tile 102 includes a multiplexer 502 that selects data for a switch input buffer 503 from either the processor 200 or the RL 500 based on a selection signal $S_i$. The selection signal $S_i$ is generated from decode logic 504 that decodes an instruction from the instruction memory 204. The logic-level instructions for configuring the RL can come from the processor 200, from a separate FIFO shift register (that can operate at a slow clock speed), from the static or dynamic network, or from memory on the tile using load-store instructions. The RL takes input from an input register 508 and provides a result to an output register 510. Data from the switch 220 can also be provided to either the processor 200 or the RL 500.

Figure 5D:
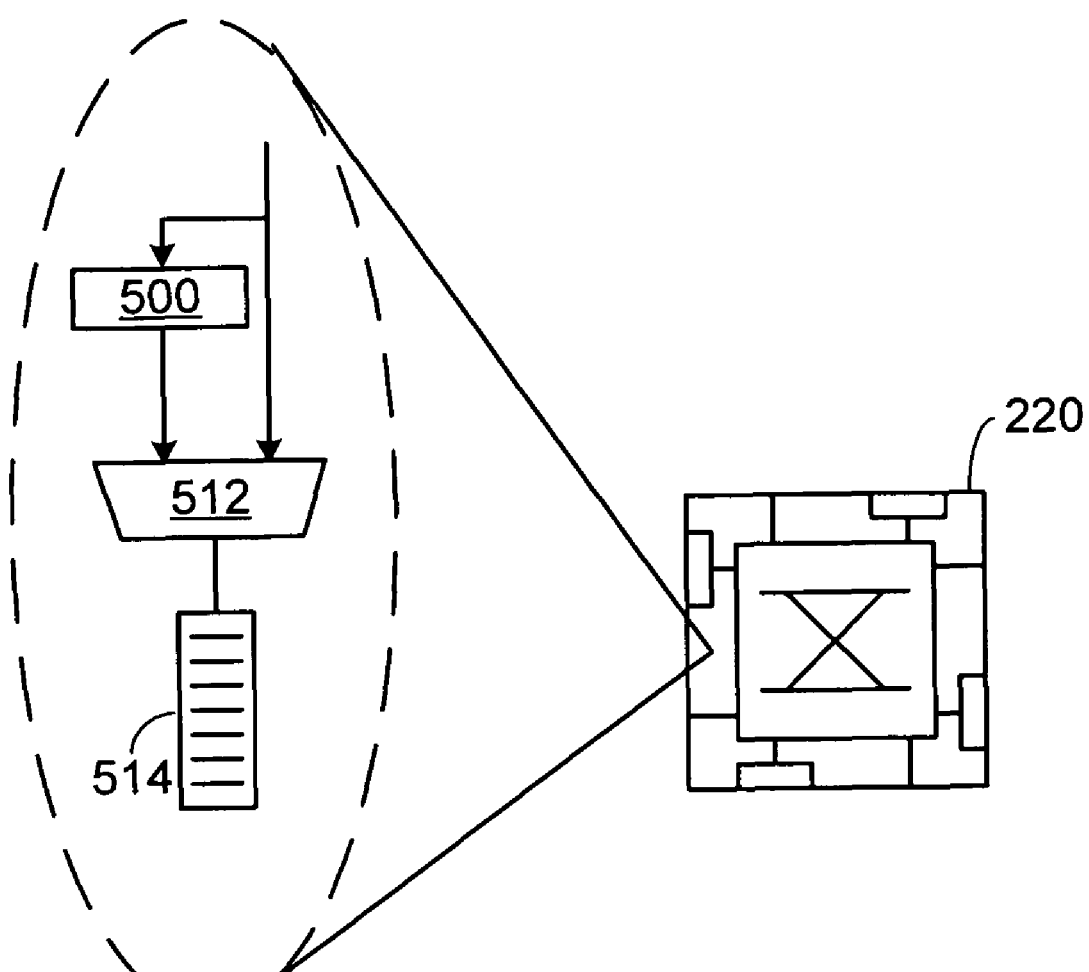

Referring to FIG. 5D, RL 500 is included in a switch 220 as optional data processing logic. A multiplexer 512 in the switch 220 is able to select whether RL 500 operates upon data to be provided to an output buffer 514.

Figure 5E:
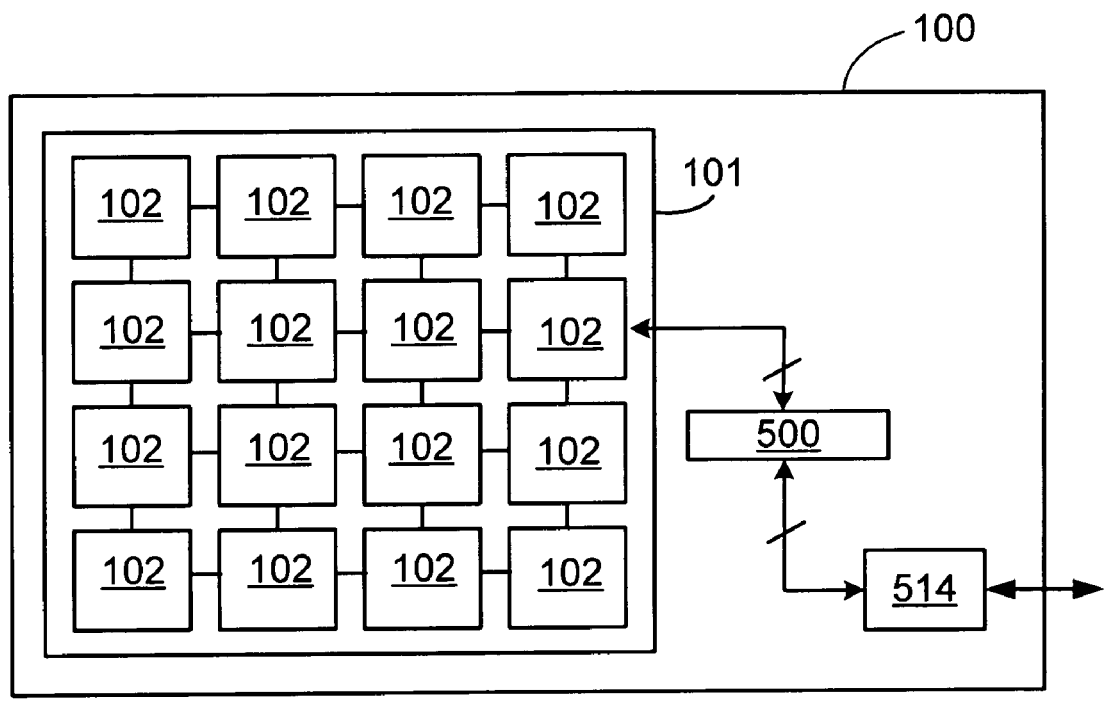
Figure 5F:
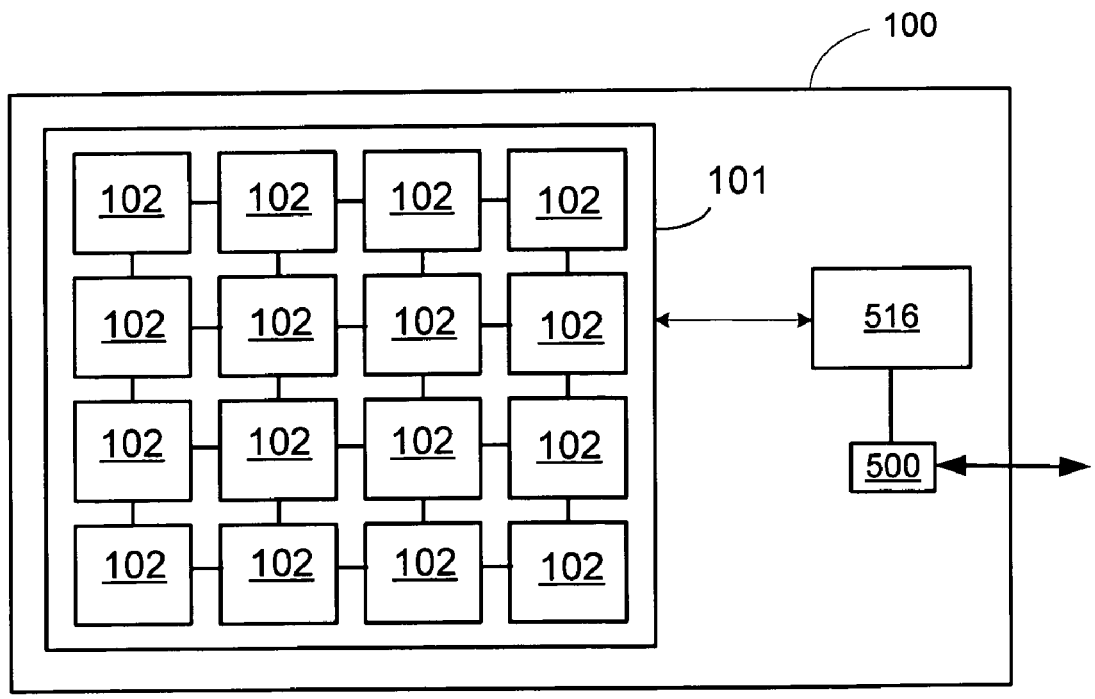

Referring to FIGS. 5E and 5F, RL 500 is optionally included at the boundary of the integrated circuit 100 FIG. 5E shows RL 500 between the array of tiles 101 and a serial interface 514. In this example, the GRL 500 connects to the switch of a tile at the edge of the array 101. FIG. 5F shows RL 500 providing an interface to an on-chip memory 516 for storing, e.g., configuration information.

Other configurations are possible for including RL 500 in a tile 102. For example, RL can be included in the processor pipeline 208 and configured to perform various operations on operands (e.g., the RL can be configured as an ALU).

The operation of the RL can be configured based on logic-level instructions stored in a memory loaded by the processor 200, or based on mode information stored in a register loaded by the processor 200, for example.

3.4 Direct Memory Access

The static and dynamic networks transport data among buffers in the switches. The buffers are used as first-in-first-out (FIFO) queues that are able to pour data into various sinks on the tile, or receive data from various sources on the tile. The processor 200 on a tile can be a source or sink of data to or from a buffer in the switch in the same tile or in a neighboring tile. For example, a buffer can be coupled to a register that the processor 200 can write to or read from. In some cases, a processor 200 may read a data word from the switch buffer and execute an instruction to store that data word in memory (e.g., either in a local cache in the tile, or in a memory external to the tiles 102 via the dynamic network).

In other cases, a larger amount of memory (e.g., multiple words) may need to be stored in memory. Using a direct memory access (DMA) approach, a block of data including multiple words can be stored in memory without requiring the processor to execute an instruction to store each word of the data (or each segment of data greater than a cache line). The processor executes one or more instructions to set up the DMA transfer for outgoing DMA. For example, the processor writes a start address and an end address of the data block to be transferred into one or more registers. Alternatively, the processor writes a start address and the size of the data block into registers.

A DMA controller in the tile transfers the data in the background without processor intervention, enabling the processor to execute other instructions during the DMA transfer. At other times, such as during a cache miss, the size of data that is sent into the cache of a tile without processor intervention is limited to one cache line (e.g., around 16 to 128 bytes). The size of the data block transferred in a DMA transfer can be much larger than a cache line (e.g., 4 Kbytes). This DMA approach can be indicated by control information within the data (e.g., the data can contain a DMA tag that determines whether the data is destined for a register (to be handled by the processor 200), or for direct memory transfer. In the static network, the tag can be appended to the data. In the case of the dynamic network, since the data is in the form of a packet with a header, the tag can be included in the header.

If the DMA tag is set, the data arriving at the switch of a destination tile is deposited into a DMA queue and the data is passed directly into a cache or static memory without involving the processor 200. If the DMA tag is not set, the data is put into a FIFO coupled to the registers of the processor 200. The value of this twofold processing is that when the data is to go into memory, the processor does not have to be involved in the receipt of the data. The DMA tag is set by the sender of the data.

In an alternative implementation, the DMA tag is not contained in the data (or its header), rather there is a mode indicator called the DMA mode indicator in the appropriate network port (or in the tile). If this DMA mode indicator is set, then the data is directed to memory.

3.5 Multiple Processor Instruction Streams

There are a variety of ways in which a tile 102 is able to process multiple instruction streams. A tile 102 is able to process an instruction stream for the processor 200 and an instruction stream for the switch 220. In the operand decoupling mode described above, the switch 220 processes multiple instruction streams (e.g., derived from a macro instruction stream) using multiple program counters to switch data for multiple output ports independently. These separate processor and switch instruction streams provides a form of concurrency in which a tile can execute computations and switch data in the same clock cycle.

In another form of concurrency, some or all of the tiles can include a processor 200 that is configured to process multiple instruction streams. The multiple instruction streams can be derived from a common macro instruction stream such as in a VLIW processor, or can be provided as separate threads. The processor 200 can include multiple logic units that process a corresponding one of the instruction streams, based on a common program counter as in a VLIW processor, or based on separate program counters as in a multithreaded processor. The processor 200 can also include multiple register files each associated with a corresponding one of the instruction streams. These multiple processor instruction streams provide a form of concurrency in which a tile can execute multiple computations in same clock cycle.

The multiple logic units can include, for example, one or more of an arithmetic logic unit, an arithmetic unit, a multiply accumulate unit, a multiply add unit, a vector unit, a load or store unit, or a branch unit. The logic units can also include units that interact with the switch, such as a switch read unit, which reads data received by the switch, or a switch write unit, which stores data that is to be sent over the switch. For example, a switch write unit can include a FIFO buffer or a register.

Figure 6A:
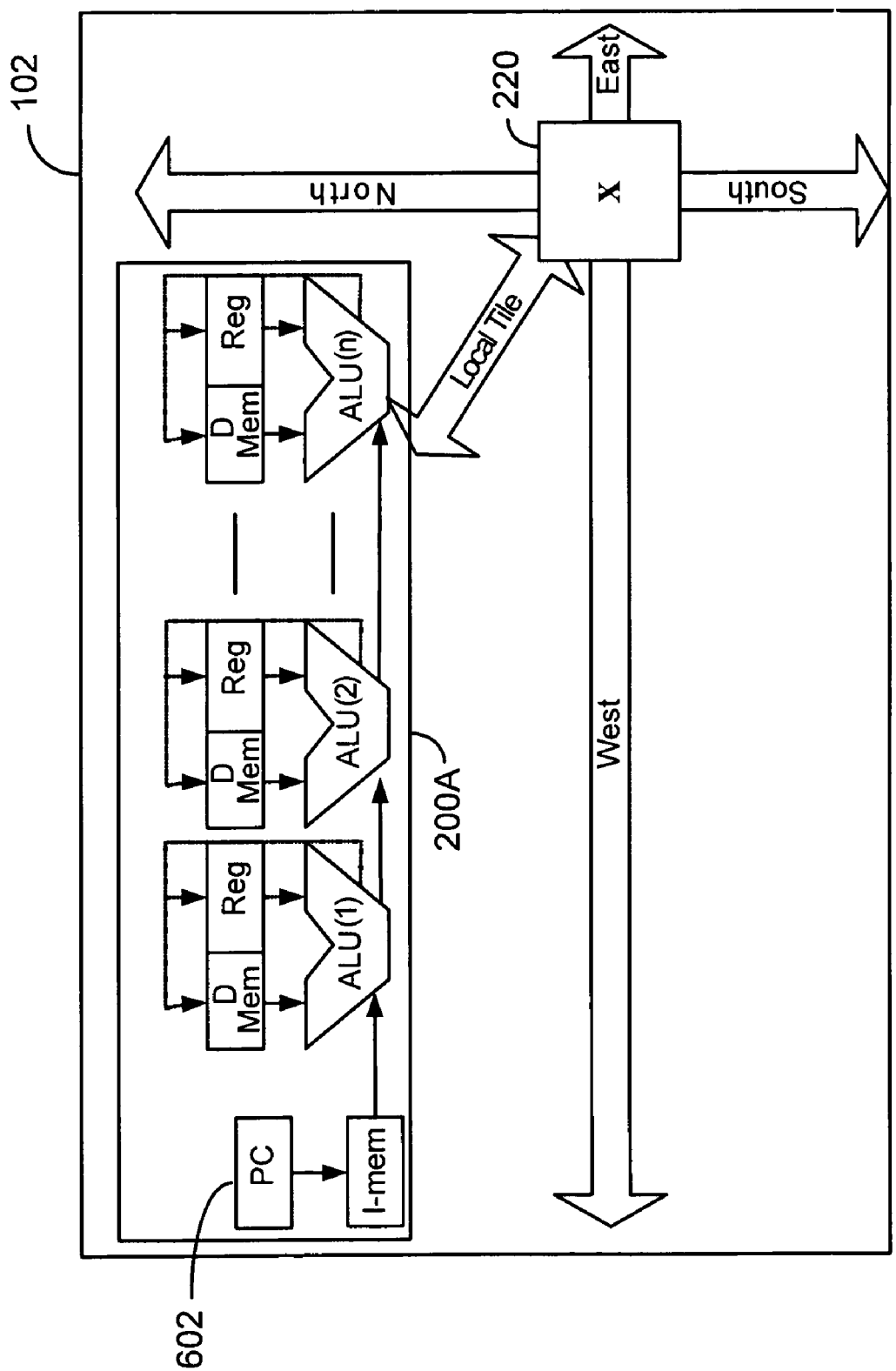
FIG. 6A is a block diagram of a VLIW processor.

In the case of a VLIW processor, the processor 200 is configured to execute instructions taking into account interactions with the switch 220. For example, the subinstructions of a VLIW instruction are executed together; therefore, if some subinstructions are reading from or writing to a port of the switch, the processor may need to stall execution of the VLIW instruction if a subinstruction is temporarily unable to read from or write to a port of the switch. FIG. 6A shows an example of a tile 102 including a VLIW processor 200A having n ALUs (ALU(1)-ALU(n)) that operate based on a common program counter 602.

Figure 6B:
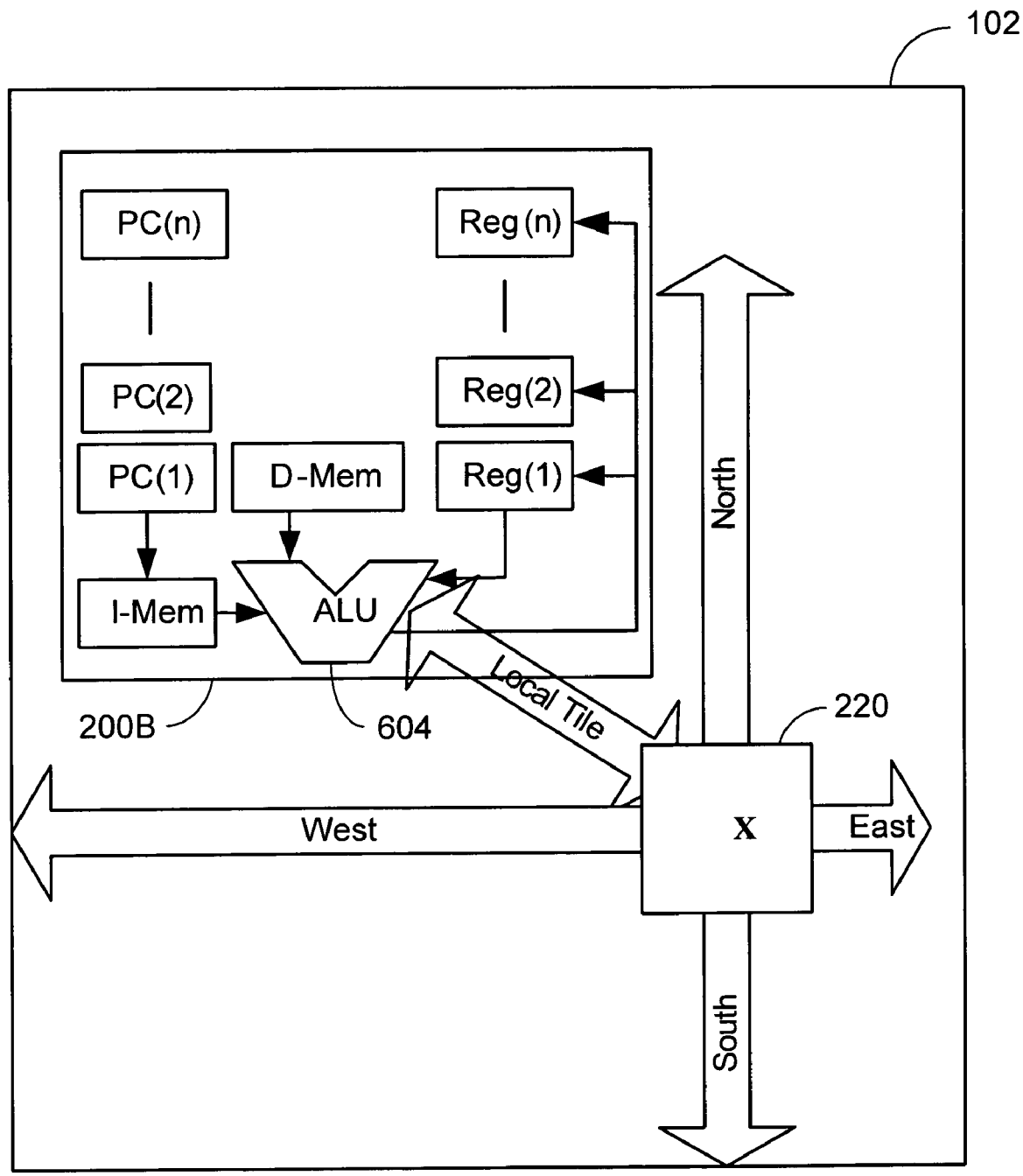
FIG. 6B is a block diagram of a multithreaded processor.

There can be a long latency associated with certain tasks such as accessing memory, sending data across the network, an synchronizing multiple tiles. When one thread of a multi-threaded processor is executing an instruction involving one of these tasks, another thread can perform another task so that the latency associated with those tasks are overlapped. FIG. 6B shows an example of a tile 102 including a multithreaded processor 200B having n program counters (PC(1)-PC(n)) and n register files (Reg(1)-Reg(n)) that can be selectively coupled to an ALU 604 so that when one thread is waiting on a long latency event, the processor 200B switch to a new thread in a new context, characterized by a different program counter and register file.

Figure 6C:
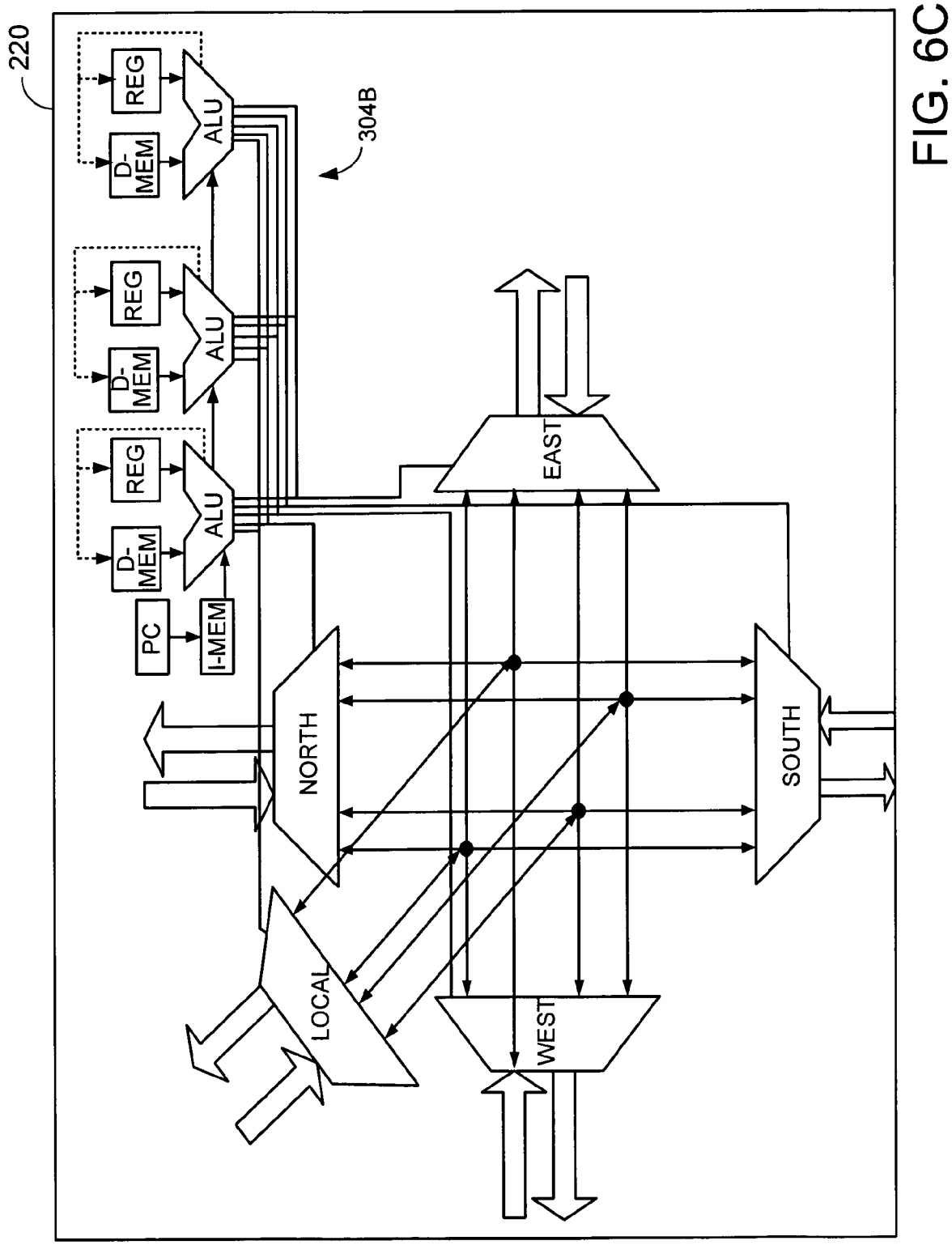
FIG. 6C is a block diagram of a VLIW switch processor.
Figure 6D:
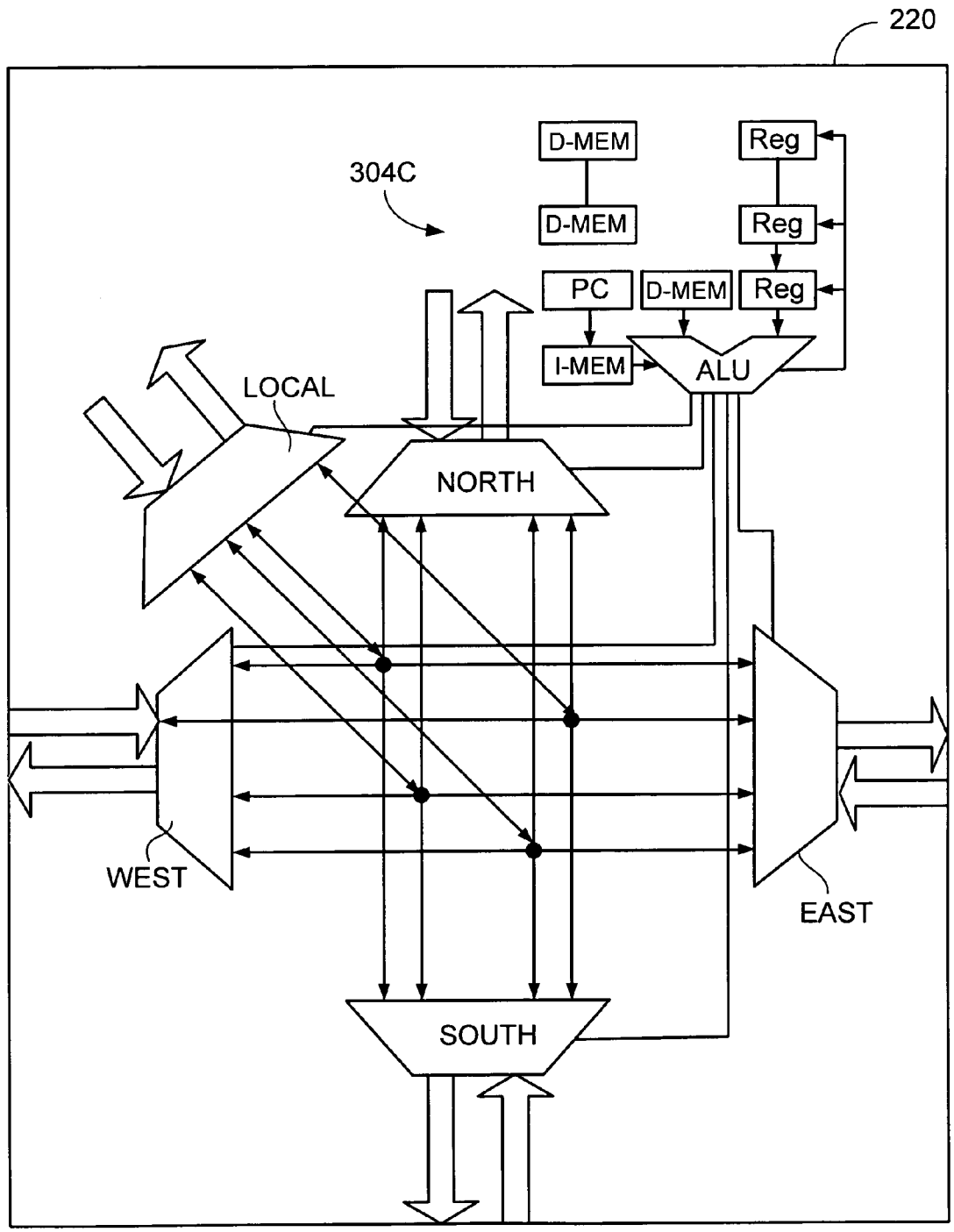
FIG. 6D is a block diagram of a multithreaded switch processor.

A switch processor can also be a VLIW processor 304B or a multithreaded processor 304C, as shown in FIGS. 6C and 6D, respectively.

When a compiler partitions a program into subprograms to execute in a tiled integrated circuit having VLIW or multi-threaded processors in the tiles, the compiler generate parallel code for a maximum number of threads larger than the number of tiles in the integrated circuit 100 (e.g., up to four times the number of tiles if each tile has a VLIW processor with four subinstructions).

In the partitioning phase, the compiler partitions a program into sets of instructions that are able to be executed in parallel. For example, the compiler uses a graph to indicate which instructions can be executed in parallel. In the placement phase, the compiler maps the sets of instructions to tiles. The compiler determines in which tile each of the sets of instructions is to be executed is based in part on critical path information from the graph to determine which instructions to run in the same tile, and which to run in separate tiles. One or more of these sets of instructions selected to run within the same tile represent a subprogram for the tile.

Thus, a subprogram for a tile may include multiple sets of instructions that can be executed in parallel threads within the tile. For example, in a VLIW processor, for those sets of instructions selected to execute on the same tile, the compiler determines instructions within the sets of instructions that will run in parallel in the same VLIW macroinstruction. The compiler determines instructions for a macroinstruction based in part on information characterizing which functional units (e.g., ALUs) are available to be used in parallel to execute a macroinstruction.

4 Dynamic Networks

As described above, the switches 220 include dynamic network circuitry for routing packets of data based on a destination address in the header of the packet. The payload of a packet includes a message or a portion of a message that is delivered to the tile at the destination address. Packets can have a fixed length, or a variable length. In one approach to variable length packets, a packet can vary in length from one word plus a header word, up to 127 words plus a header word. The header word contains a field that determines the length of the packet.

The control module within a tile controlling the dynamic switch (e.g., a dynamic switch processor) performs functions for transmitting, routing, and receiving packets. In some cases, the control module in a receiving tile processes multiple packets to recover a message that is larger than the maximum packet size. For example, the control module in the transmitting tile segments the message among payloads of multiple packets. The control modules in the tiles along a route between the sending and receiving tiles route the segments in the order in which they are received. The control module in the receiving tile reassembles the message. This segmentation and reassembly can be controlled by a communication protocol in software running in a dynamic switch processor of a transmitting or receiving endpoint tile, or in software running in the tile's main processor 200. In other cases, the atomicity afforded to data by packetization enables data associated with an atomic transaction to be transmitted in the payload of a single packet to ensure that the data will not be interrupted by other packets.

The tiles can include circuitry for multiple independent dynamic networks. The different dynamic networks can each be dedicated to handling a particular type of traffic. For example, one dynamic network handles traffic associated with a user, called the User Dynamic Network (UDN). Another dynamic network handles traffic associated with the operating system and is primarily used to communicate with input and output devices, called the Input/Output Dynamic Network (IODN). Another dynamic network handles enables tiles and I/O devices to interface with copious memory (e.g., DRAM coupled to the network), called the Memory Dynamic Network (MDN).

In one approach to deadlock recovery, described in more detail below, the MDN is used in a specific manner to guarantee that deadlock does not occur on the MDN. The MDN is also used for inter-tile memory traffic (e.g., to a tile's data cache). Data can be coupled to the MDN by the processor 200 in the tiles, or by a DMA interface in the tiles. The DMA interface can be coupled to one or more of the other networks as well.

The control module handles routing data from a sender to a receiver. Routing includes processing a destination identifier to determine a route the data should traverse to the receiver. In some implementations, the dynamic networks have a two-dimensional topology and use dimension-ordered worm-hole routing. The dimension-ordered nature of the networks means that packets on the network follow a deterministic routing path, for example, first along the "x" dimension (e.g., East/West) and then along the "y" dimension (e.g., North/South) in a two-dimensional network.

Figure 7:
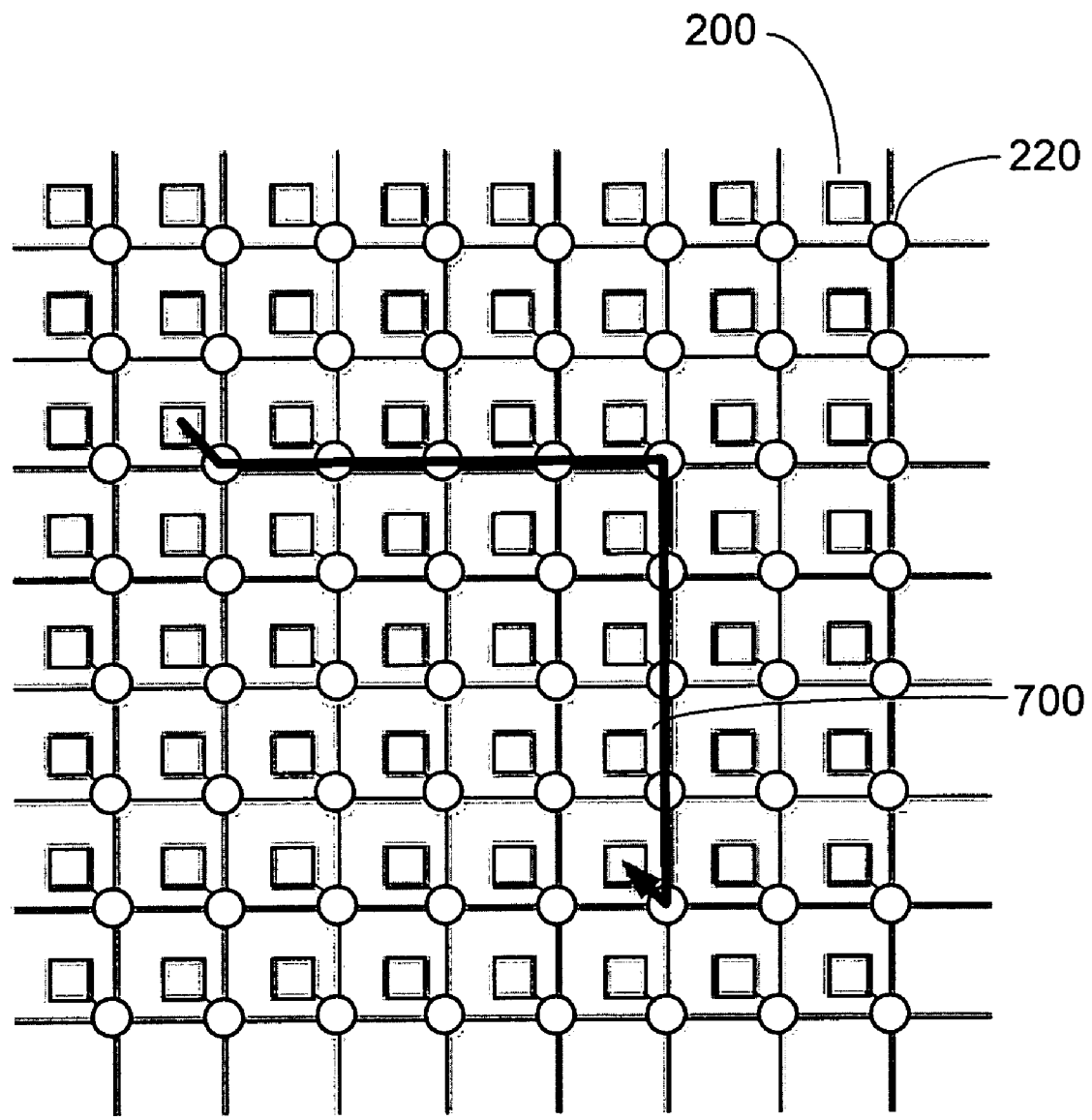
FIG. 7 is block diagram of a route through an array of tiles.

FIG. 7 shows the path 700 taken by a packet sent from the tile at coordinates (1,2) to the tile at coordinates (5,6). As in the static network, each clock cycle one word of data traverses a link from one tile to a neighboring tile. The head word of the packet (e.g., the header) worms through the network and reserves links between the intermediary switches along the route. Subsequent words of the packet up to the tail word continue to worm through the network along the same path set up by the head word. The tail of a packet worms through the network and clears the path for use by other packets. As the tail traverses the network, it clears up a path for other packets to use reserved links. Wormhole networks are named as such because packets appear to worm through the network. One reason that wormhole networks are advantageous is that they reduce the amount of buffer space needed in the switches.

A packet reaches its destination when both the x and y coordinates match the coordinates of the destination tile (e.g., stored in a register loaded when the system boots). Alternatively, the packet header can contain the number of hops in the x dimension as a $\Delta x$ count and the number of hops in the y dimension as a $\Delta y$ count. In this scheme, the value of $\Delta x$ is decremented after each hop in the x dimension, and the value of $\Delta y$ is decremented after each hop in the y dimension, and the packet reaches its destination when $\Delta x$ and $\Delta y$ become 0. The packet is then sent to a final destination port (also indicated in the packet header) to the north, east, south, west, or into the processor. This final destination routing enables data to be directed off of the network to an I/O device or memory interface, for example.

4.1 Local Link-Level Flow Control

Reliable data delivery is achieved in the dynamic network using flow control to ensure that data is not lost or dropped when being routed in the network. Local or "link-level" flow control ensures that data is lost or dropped over a link between two tiles (e.g., due to limited buffering at a switch). Global or "end-to-end" flow control is used to further control the rate of data delivery between a sending tile (the "sender") and a receiving tile (the "receiver"), and is described in more detail below. Link-level flow control is not in general sufficient to provide end-to-end flow control due to the possibility of deadlock, (in this case, for example, due to limited buffering at a receiving tile at the end of a route) also described in more detail below.

One aspect of flow control includes managing the dynamic switch input buffers. Backward pressure is used to prevent a sending switch from sending further data if the input buffer at the receiving switch is full. This type of flow control is also called "backward flow control."

A first approach to implementing link-level flow control includes a signal sent from the receiver to the sender (e.g., over a dedicated wire) indicating that a particular input buffer is full, and that the sender should not send more data over the link. This "full signal" should be generated and sent to the sender quickly to reduce the delay in the critical path of link-level flow control.

A second approach to implementing link-level flow control is a credit-based approach. In this approach, the sender does not need to receive a signal from the receiver that buffer space is available (the buffer is not full) each time data is sent. In the credit-based approach, each sender maintains a count of the remaining space in the receiver's input buffer. As data is sent over a link, the sender decrements the count. When the count reaches zero, there is no more space in the input buffer and the sender is barred from sending data over the link. As data is read out of the input buffer, the receiver sends credits to the sender. The sender increments the count for each credit received.

In the credit-based approach, dynamic switch circuitry can be pipelined and can maintain full speed switch throughput. The size of the input buffer and associated credit counter are selected appropriately to account for the latency needed to send a credit from the receiver to the sender and to determine whether to send any further credits.

Figure 8:
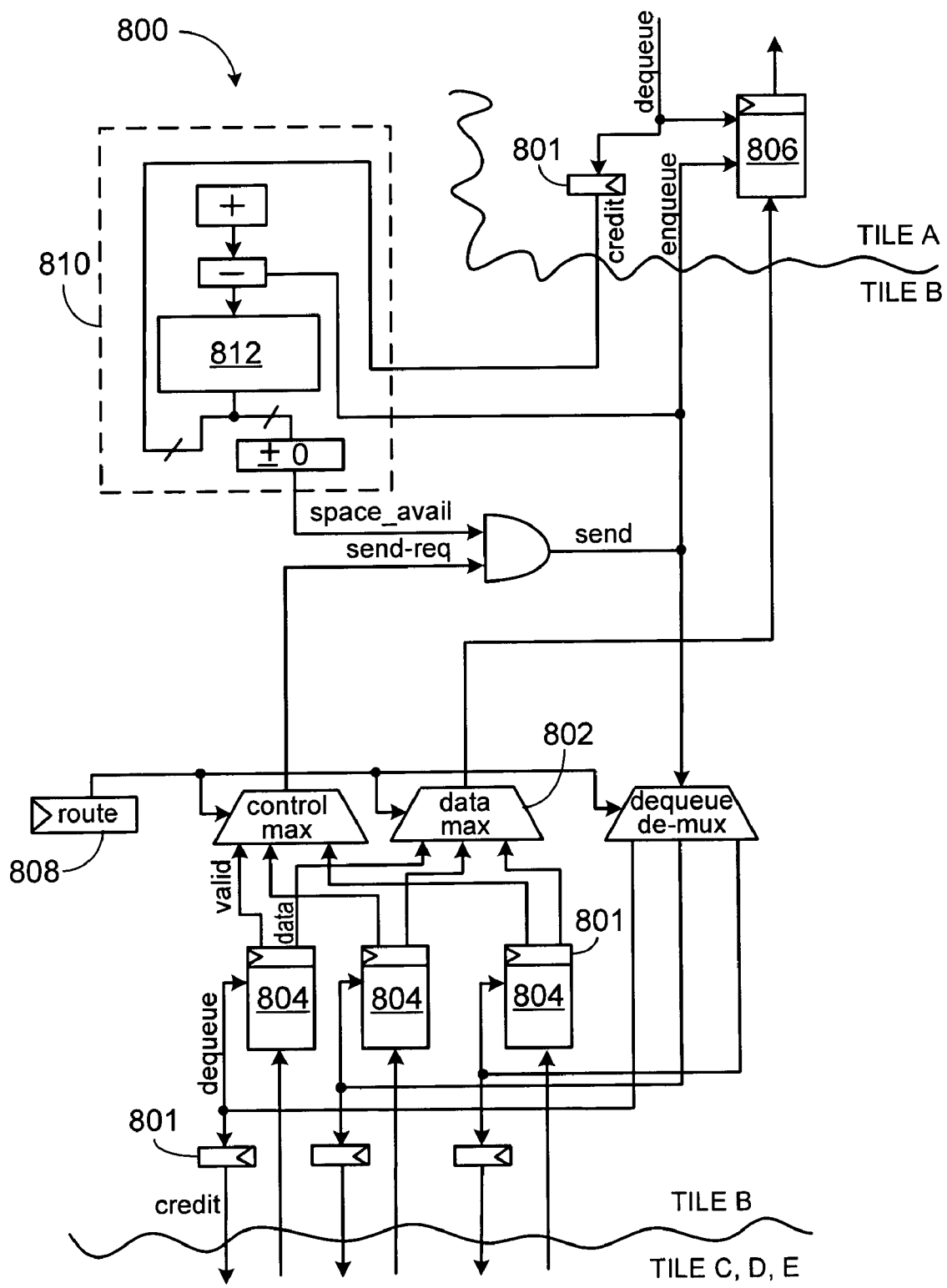
FIG. 8 is block diagram of switching circuitry.

Referring to FIG. 8, switching circuitry 800 for a credit-based approach switches data among input buffers that each store up to 3 words of data corresponding to the arrangement of pipeline registers 801. The switching circuitry 800 is a portion of the dynamic switch that controls the flow of data from a sender tile_b to a receiver tile_a. The sender tile_b includes a data multiplexer 802 that selects a data word from input buffers 804 to send to the input buffer 806 of the receiver tile_a, according to route information stored in a route register 808. The route information is generated based on the headers of incoming packets. The sender tile_b includes an input buffer for each of the tiles to which it is connected (tile_a, tile_c, tile_d, tile_e, . . . ). However, since the switching circuitry 800 controls the flow of data to tile_b, the data multiplexer 802 does not necessarily need to be able to pull data from tile_b. Corresponding circuitry is used to control the flow of data from the sender tile_b to other tiles to which tile_b is connected.

Control circuitry 810 counts credits in a credit counter 812 corresponding to input buffer space available in the receiver tile_a. If there is at least one credit and an input buffer has data to be sent, the control circuitry 810 will assert a signal to dequeue data from the appropriate one of the input buffers 804 and enqueue the data to the input buffer 806. Otherwise the control circuitry 810 will stall, not sending any data to the receiver tile_a.

The credit counter 812 tracks available storage space in the input buffer 806 to ensure that the input buffer 806 will not overflow. However, the number of credits stored in the credit counter does not necessarily correspond to the actual amount of available buffer space in the input buffer 806 at that time since the control circuitry accounts for data that may flow into the input buffer 806 from pipeline registers.

4.2 Deadlock Strategies

Deadlock is the inability for an entity to make forward progress due to the dependence of a chain of resources or required actions that ultimately depend on the entity itself yielding a resource or taking some action. In effect, deadlocks can be thought of as chains of dependent resources or actions that contain cycles. This property of deadlocks can be quite instructive when used as a manner to detect deadlocks. Thus, one approach to detecting deadlocks includes statically analyzing a network or protocol and showing that cycles do not occur in graphs that describe the dependencies that need to be resolved to accomplish any outcome.

In computer systems, deadlock is almost never a desirable outcome. In dynamic networks, deadlock is something that should be addressed in order for the dynamic network to provide a guarantee that all packets sent on the dynamic network will be delivered. If a deadlock occurs in a network then it may not be possible for further data to be delivered. When the dynamic networks of the integrated circuit 100 use dimension-ordered routing, it can be shown that the dimension-ordered routing protocol itself does not produce deadlocks. For example, it can be shown that to successfully route a packet, a packet must obtain access to routing resources in the "x" dimension before obtaining resources in the "y" dimension. Thus, in dimension-ordered routing, there is no case where a packet needs to obtain a resource that ultimately depends on a resource that is currently being held by that packet. More formal proofs of the deadlock-free nature of dimension-ordered routing can be found in the literature.

While dimension-ordered networks are deadlock-free with respect to the transportation of packets, the use of a dimension-ordered network does not prevent higher-level deadlocks from occurring. For example, dimension-ordered wormhole routing can still produce high level deadlocks. High level deadlocks are caused by the users of the dynamic network through the manner in which they utilize the network (e.g., due to limited buffering space at a data sink).

There are different types of high-level deadlocks that can occur. One type is a communication dependent deadlock. Communication dependent deadlocks contain a cycle in the dependency graph associated with a communication pattern.

This type of deadlock arises from design error and can be resolved by redesigning the communication protocol that gave rise to the communication pattern. Another type of deadlock is limited-buffer deadlock, which would not occur if the network contained more buffer space. For example, this type of deadlock can arise from link congestion due to dependencies introduced into a dependency graph by wormhole routing.

Figure 9:
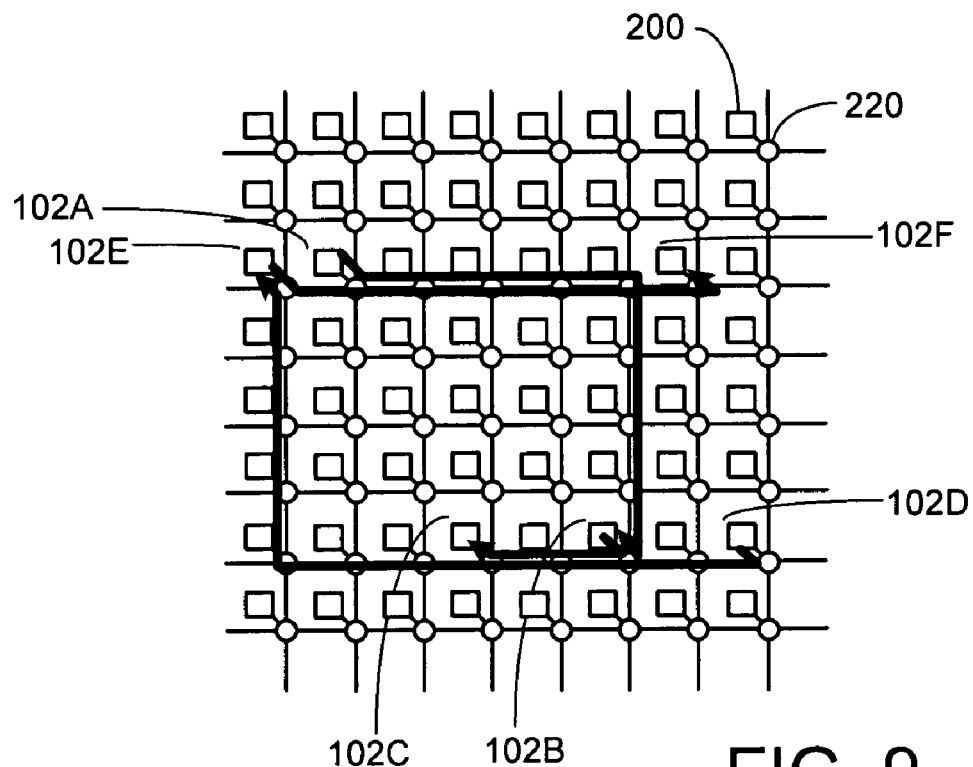
FIG. 9 is a diagram of a communication pattern in an array of tiles.

FIG. 9 shows an example of a communication pattern that deadlocks on a network with a given amount of buffer space, but does not deadlock on a network with a larger amount of buffer space. In this example, there are two independent sets of communication occurring. Tiles 102A, 102B, and 102C are able to communicate using a first communication pattern in a deadlock-free manner; and tiles 102D, 102E, and 102F are able to communicate using a second communication pattern in a deadlock-free manner. But, when these two communication patterns are intermixed, they become dependent on each other, introducing a cycle into an associated dependency graph.

In this example, suppose that tile 102A and tile 102D both launch a packet longer than the buffering space between them and their destinations into the network simultaneously. Tile 102A's packet is destined for tile 102B and tile 102D's packet is destined for tile 102E. After receiving the first few words of the packets (and filling their input buffers), tiles 102B and 102E decide that they need to send a packet to tiles 102C and 102F, respectively, before completing the reception of their inbound packets. Unfortunately, due to the blocking nature of wormhole routed networks, the physical channels between 102B and 102C are already blocked by a packet from 102D to 102E. Likewise the packet from 102E to 102F is blocked by the packet from 102A to 102B. Thus, the packet from 102E to 102F is dependent on the packet from 102A to 102B, which is dependent on sending the packet from 102 B to 102C, which is dependent on the packet from 102D to 102E, which is dependent on sending the packet from 102E to 102F. Since the packet from 102E to 102F is dependent on itself, a dependency cycle has occurred causing deadlock.

In this example, it can be shown that if there were more buffer space in the receiving tiles 102B and 102E, the originally launched packets could be completely stored in the input buffers, freeing the blockage and enabling the data to flow in a deadlock free manner. Similarly, the communication patterns chosen in this example are deadlock-free if run independently (e.g., using separate resources).

4.2.1 Deadlock Avoidance

One way to handle communication dependent deadlocks in a dynamic network is to institute a restricted usage policy for the network to avoid situations in which deadlock would occur. A simplistic example of deadlock avoidance is to say that only one packet is allowed in the network at any given time. However, this may be too restrictive and may not achieve good performance.

Another form of deadlock avoidance is to enforce that the communication patterns can be separated into logical channels and arranged on the network in a manner that does not allow two logical channels to use the same physical channel (e.g., the same buffer space). This logical channel separation approach is a feasible design, but may require too many physical channels for all of the logical channels that may be used on any given network.

An example of logical channel separation approach is to have two logical types of packets: requests and responses. These logical types are mapped onto physical channels such that requests can only utilize north and west links in the network and responses can only utilize east and south links in the network.

A variant of the logical channel separation approach is called a virtual network scheme. In this scheme, two or more virtual networks (e.g., a request network and a response network) are implemented on a single physical network. This is done by implementing separate buffers (e.g., request buffers and response buffers) for the two virtual networks. Only request packets can occupy the request buffers and only response packets can occupy response buffers. The same set of physical channel wires are used by both request packets and response packets. In this scheme, one type of packets (e.g., response packets) can bypass another type of packets (e.g., request packets) when the request packets are blocked and not moving forward, by occupying buffers that are reserved for response packets.

Another form of deadlock avoidance is to guarantee that the network will be cleared if, at any given time, all of the sending tiles stop sending packets. One way to accomplish this is to reserve sufficient storage space in the tiles such that any packet sent into the network can be temporarily stored in the reserved storage space without filling the input buffers in the network. Thus, if all of the tiles stop sending additional data words, the receiving tiles would ultimately completely drain the network. An implicit assumption in this type of design is that the receive side buffering and draining is independent of sending into the network or any unbounded time computation or handling. To implement this approach, the network has the ability to signal a sending tile to stop sending additional words when the receiving tile's buffer is full using a credit based flow control system, an acknowledgment system, or a negative acknowledgment system.

The MDN uses a deadlock avoidance approach to guarantee that communication dependent deadlock does not occur. In order to prevent deadlock, the MDN protocol is carefully designed to remove dependencies and follows a request-reply protocol along with a credit based flow control system which guarantees that all requests are sinkable in off-network storage. This approach enables the MDN to provide a deadlock-free path to copious memory used in the buffer virtualization approach described below.

4.2.2 Deadlock Recovery

Another approach for handling deadlock is to allow limited-buffer deadlocks to occur and provide a way to detect that a deadlock has occurred and recover from the deadlock. One way to recover from limited-buffer deadlock is to add more logical or "virtual" buffering to the network. This does not necessarily require any more physical storage space in the tile input buffers, but rather extra buffer space can be reserved in a copious memory source (e.g., on-chip or off-chip SRAM, DRAM, flash memory, or disk storage). The extra buffer storage space may be within the tile if, for example, the copious memory source has cache on the tile and the amount of memory needed does not spill to memory outside of the on-tile cache. One or more of the dynamic networks, including the UDN and IODN, can be a "recovery-based network" using this approach of deadlock detection and recovery. The path to the copious memory source is itself free from deadlock, for example, a network (the MDN) using deadlock avoidance. This way, if any of the recovery-based networks deadlocks, then that network can be drained out to copious memory over the network that utilizes deadlock avoidance.

Before a deadlock recovery mechanism can be engaged, a deadlock needs to be detected. Deadlock detection on a distributed fabric of tiles calls for a distributed approach to detecting that a deadlock has occurred. For example, to detect deadlock, each tile contains a deadlock detection timer that counts how many cycles data words stay in the input buffers without making forward progress. When one or more of the counters reaches a software defined threshold, a suspected deadlock has occurred and a deadlock recovery process is triggered.

In one approach to deadlock recovery, a suspected deadlock triggers an alert in the form of a deadlock interrupt delivered to the tile's processor. When the processor is interrupted, software running on the processor removes the packets that triggered the alert and stores the packets into copious memory. This approach to deadlock recovery, however, changes the semantics of receiving network data. Instead of simply receiving data from a network mapped port, a program running on a tile would receive data from either the port or from memory, depending on the deadlock recovery state.

Another approach to deadlock recovery avoids the need for a change in semantics of receiving network data by using buffer virtualization. Buffer virtualization circuitry is used to provide the same software interface to the networks whether the data is coming from the network input buffers or from memory. For example, the software interface to the dynamic networks is provided through register mapped switch ports. The source of the data to these switch ports changes depending on when the switch is in a "virtualized" versus "non-virtualized" mode.

Figure 10:
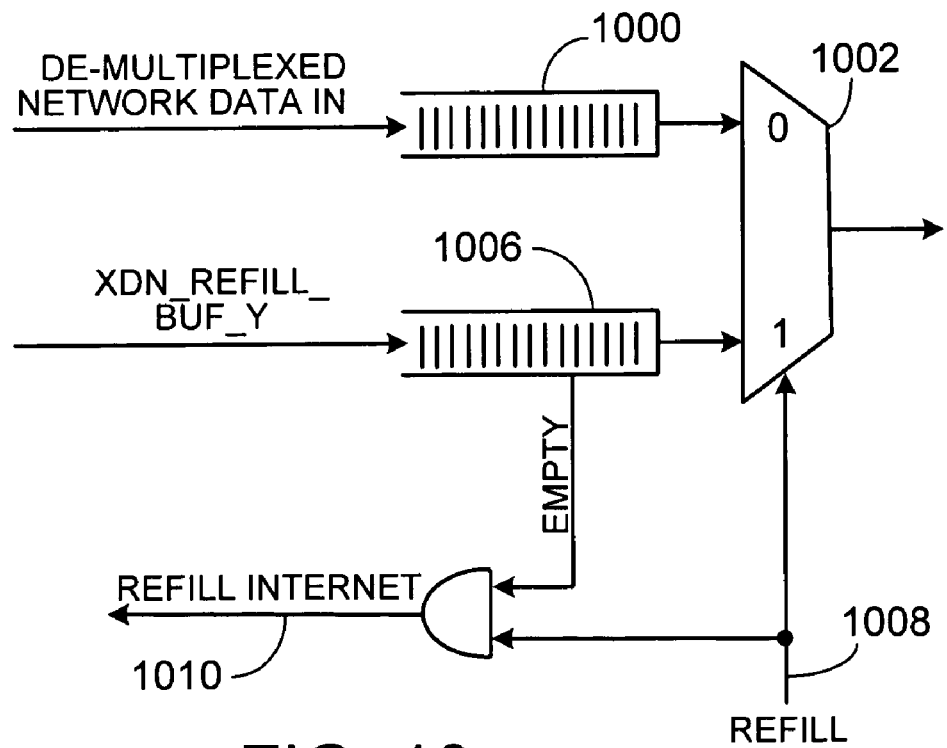
FIG. 10 is a block diagram of a dynamic network virtualized buffer.

Referring to FIG. 10, a dynamic network input buffer 1000 is fed into one port of a multiplexer 1002. The other port of the multiplexer 1004 is fed by a refill buffer 1006. The refill buffer 1006 can have one or more entries each storing a word. The multiplexer 1004 provides data to a register mapped interface from either the input buffer 1000 or the refill buffer 1006, based on a refill signal 1008. Under non-virtualized operation, the refill buffer is empty and the packet data is provided to the processor, or to switch output ports, from the input buffer 1000. As described below, after a deadlock is detected, data from the input buffer 1000 may be moved into a queue in copious memory. When the switch resumes reading data the refill signal 1008 is set and data is provided from memory via the refill buffer 1006 instead of from the input buffer 1000. When the refill buffer becomes empty, and the refill signal 1008 is still enabled, an interrupt 1010 signals that the refill buffer is empty and needs to be refilled from memory. If the queue in memory is empty then refill signal 1008 can be disabled and data can be read from the input buffer 1000 again. Thus, by using the multiplexer 1004, the refill buffer 1006, and refill signal 1008, an input buffer 1000 can be "virtualized" by using a queue in copious memory to appear as buffer space in the network.

After a deadlock is detected, in order to recover from the deadlock, the deadlock detection counter triggers an interrupt signaling that the network has not moved for a predetermined period of time (set by the threshold). At this point, an interrupt handler removes all of the inbound packets stored in the tile's input buffers and stores their contents into memory. This memory may be in a cache in the tile or may spill out into copious memory. If the data is sent to copious memory, the path to that memory is deadlock-free due to the deadlock avoidance protocol that the MDN utilizes. After data has been stored into memory, it is the responsibility of the interrupt handler to turn the particular input port into virtualized mode and keep the refill buffer full until there is no more data destined for the particular input port stored in memory. By providing a refill buffer that stores multiple data words, and loading multiple words into the buffer on an interrupt, the number of interrupts taken can be reduced, improving performance. As the tiles remove packets and hence contention from the deadlocked network, traffic begins to flow again. Multiple tiles may need to remove data from their input buffers to recover from limited-buffer deadlocks. Also, a single tile may have to trigger an interrupt multiple times to clear a deadlock.

4.3 Global End-to-End Flow Control

The dynamic networks are able to guarantee reliable delivery of data. Part of the ability to provide this guarantee comes from the local link-level flow control. In addition to reliable delivery of packets, global end-to-end flow control is concerned with rate limiting communication between communicating endpoints in a network. Forward and backward pressure are used to synchronize the rates at which data is sourced into the network and sinked from the network. End-to-end flow control enables a receiving tile to receive forward pressure from the network if the sending tile has not sent any words to the receiving tile, and enables a receiving tile to apply backward pressure to notify a sending tile targeting a receiving tile that it is not capable of accepting any more data.

Simply providing link-to-link flow control is not in general sufficient to provide end-to-end flow control because deadlock can occur in the network, as in the example above. Other mechanisms, such as credit-based flow control, can be used to provide end-to-end flow control on a dynamic network.

4.3.1 Credit-Based Flow Control

One manner to provide end-to-end flow control is to use long distance credit-based flow control. The link-level credit-based flow control described above operates between switches connected by a link. The end-to-end credit based flow control described in this section operates between a sender and receiver dynamic switches, which may have many routing dynamic switches between them. End-to-end flow control can be implemented in hardware, or in software, or in a combination of hardware and software.

In credit based flow control, a sending tile maintains a count of how many buffer entries are free for its use for particular flow of data to a particular receiving tile. As the sending tile sends data, it decrements the count until the count reaches zero indicating all of the remote buffer space has been utilized. The count reaching zero indicates that no more space is available and is a form or backward flow control. In a credit-based flow control approach, the receiving tile signals the sending tile that data has been dequeued from the input buffer to free additional storage space by sending an acknowledgment to the sending tile denoting how much data has been dequeued from the input buffer.

If credit-based flow control is used and the sending tiles limit the amount of data injected into the network based on a known amount of input buffer space, then at any time, if the sending tiles were to stop sending, all of the in-flight packets would drain into the input buffers and the network would be clear. In effect, credit-based flow control is also able to avoid deadlock. However, the amount of input buffer space in the tiles can be small (e.g., on the order of a few words). Thus, buffer space can be a scarce resource, especially when there are many flows targeting any given receiving tile. Thus, when the buffer space is divided by the number of active flows targeting any tile, the number of outstanding words that a sending tile may send safely without receiving an acknowledgment may be small.

In one example, each link in a network transmits one word per cycle, a pair sending and receiving tiles are separated by 20 links, and the input buffer size is four words. The sending tile is able to send four words and then is stalled until an acknowledgement is received from the receiving tile, which may be in the best case 20+20−4=36 clock cycles after sending the fourth word. This effectively reduces the rate at which the tiles can operate down to one tenth of its maximum possible rate (4 words sent in 40 cycles). To sustain a maximum communication rate between two tiles, the buffers need to be the size of the bandwidth-delay product, which is the amount of data sent across the network before an acknowledgment is received.

The protocol that is used on the MDN includes credit-based flow control with pre-allocated buffering space in copious memory (or in special buffer memory at the endpoints either on-chip or off-chip) to avoid deadlock. Each tile is allocated a certain amount of buffer space. As data is sent to the memory, an in-tile counter is decremented until all of the buffer space is utilized at which point the MDN stalls awaiting acknowledgments.

The UDN and IODN are capable of recovering from a limited-buffer deadlock, but these networks may still benefit from limiting the rate of data flow. For example, a computation operated on a stream of data may benefit by using flow control to limit an upstream data source. Another reason for end-to-end flow control on the UDN and IODN is to bound the amount of buffer space needed in copious memory for the deadlock recovery queues.

4.3.2 Lazy Acknowledgment Protocol

When implementing credit based flow control, in general, some entity, whether it be software or hardware, generates acknowledgments. There are several ways to determine when to send acknowledgments. In one approach, on every word that is consumed at a receiver, the receiver sends an acknowledgment to the sender. In another approach, the receiver sends an acknowledgment to the sender after receiving a predetermined number of words. This acknowledgment coalescing is done to reduce the bandwidth needed to support acknowledgments.

In an approach called the Lazy Ack Protocol (LAP), instead of putting the responsibility of determining when to send acknowledgments on the receiving tile, the sending tile determines which packets are to be acknowledged. In one implementation of the LAP, the sender sets a tag in a header of a to request the receiver to respond with an acknowledgment. Thus, a sender is able to mark a packet as the one to be acknowledged. It is the receiver's responsibility to acknowledge all packets received that have been marked as needing to be acknowledged. Utilizing the LAP can significantly reduce the amount of bandwidth used by acknowledgment traffic because one strategically placed acknowledgment request can represent many words having been processed.

In order for the LAP to provide good performance, the sending tile should request acknowledgments before the sending tile's credit count reaches zero. For example, the request should be generated with enough credits remaining for the resulting acknowledgment to arrive before the credit count reaches zero. If the sender were to wait until the credit count was near zero before requesting an acknowledgment, the sender would stall for at least the round trip delay to and from the receiver.

4.3.3 Oversend Buffer Protocol

The deadlock recovery approach using buffer virtualization is able to store a large amount of data in copious memory. Therefore, the UDN and IODN using deadlock recovery do not need to use credit-based flow control to prevent overflow of the input buffers. Nevertheless, it may be useful to use credit-based flow control, for example, to limit on the amount memory that could potentially be used in deadlock recovery.

As described above, for good bandwidth utilization in credit-based systems, the amount of input buffering per flow should be at least the size of the bandwidth-delay product. However, this amount of physical on-chip buffering space may be area prohibitive. Even if large amount of input buffer space were added at the expense of integrated circuit space, this would aggravate the problem by pushing tiles further apart causing longer latencies and requiring more buffering space.

To provide credit-based flow control with high bandwidth utilization and modest input buffering requirements in the context of virtual buffering, an oversend buffer protocol (OBP) can be used. The OBP provides credit-based flow control that allows the sending tiles to assume that there is more input buffer space at the receiving tile than is physically available. Thus in this approach, sending tiles may send more data than is guaranteed to be stored in a receiving tile's input buffer. In the common case, where the receiving tile is reading from its input buffers in a timely manner, the network will continue to flow and the network will not deadlock. The link-to-link flow control may impose some amount of rate limiting on the sending tile.

When the OBP is employed in a network using deadlock detection and recovery, the deadlock detection timer that is watching the input buffer can be adjusted to a greater value. The more the amount of "oversending" (the amount by which the credit exceeds the input buffer size), the more the threshold value of the deadlock detection timer can be increased.

The OBP may deadlock if the receiving tile does not expeditiously read from its input queue or there is a large amount of network traffic. In this case, the OBP utilizes the deadlock recovery mechanism to provide virtual buffering space in copious memory. The OBP can be thought of as effectively providing a large virtual input buffer at each receiving tile dedicated to each inbound flow. This virtual input buffer is larger than the dedicated physical input buffer and can be thought of as providing part of the input buffer space in the on-tile cache or in copious memory and part in the physical input buffer.

Another benefit provided by the OBP is that the amount of storage space in copious memory that could potentially be used is bounded. Furthermore, because the receiving tile's input buffer can be virtualized through a cached memory system, there is a strong chance that this virtual buffer space is actually stored in local cache in the tile and not in off-chip copious memory.

4.4 Network Interfacing

The dynamic networks can include features that facilitate coupling data to and from the processor, and that enable efficient handling of incoming messages. Register mapped network interfaces, pipeline integration (e.g., integration of a switch interface in pipeline bypass paths), and receive side de-multiplexing are examples of such features.

4.4.1 Register Mapped Network Communication

As described above, dynamic networks are able to transfer data to and from the main processor through a register mapped interface. When the main processor reads a register corresponding to a particular network, the data is dequeued from the respective network input buffer. Likewise, when a register associated with a particular network is written by the processor, the data is directly sent out of a corresponding network output port.

The register mapped networks are both read and write flow controlled. For instance, if the processor attempts to read from a register connected to a network and the data has not arrived yet, the processor will stall in anticipation of the data arriving. Outbound data communication can also receive backward pressure from the networks to prevent it from injecting into the network if the network buffer space is full. In this case, the processor stalls when the outbound buffer space is full for a particular network.

For efficient register mapped communication, the dynamic networks are integrated closely into the processor's pipeline. In effect, they contribute to the scoreboarding in the processor, and the processor maintains correct output ordering across variable length pipelines. One possible implementation of this register mapped communication is via integration of the input or output buffers into the bypass network of the processor pipeline. By doing so, for example, a value going out from the ALU in a pipeline can go to the switch on an immediately following cycle, and well before the pipeline writeback stage (which is the "pipeline commit stage" in some pipelines) when the data value is written into the register file. In the case of the tiled integrated circuit in which pipelines are coupled via a switch network, the pipeline commit stage is the earlier stage (generally earlier than the writeback stage) in which a value can be injected into the network. This is called an early commit pipeline. Also, in order to reduce latency, it is desirable to expeditiously forward a value to the network as soon as the value is computed. In order to accomplish this, an implementation may contain a forwarding network which chooses the oldest completed information in the pipeline to forward out to the network.

The register mapped interface to the processor can include multiple registers that are mapped not only to a particular input port, but to characteristics associated with inbound communication as described in more detail in the following section.

4.4.2 Receive Side De-Multiplexing

In a dynamic network, each tile can receive packets from a large number of tiles. For many applications, the receiving tile needs to be able to quickly determine, for any message that it receives, which tile sent the message. The dynamic networks can perform sorting or "de-multiplexing" of packets at a receiving tile into de-multiplexing queues. The incoming packets can be sorted based on a tag, where the tag may represent the sending tile, a stream number, a message type, or some combination of these or other characteristics. A tile can optionally remove headers and tags such that only data is stored into the de-multiplexing queues.

In a software approach to receive side de-multiplexing each message contains a tag, and for each new message received, the receiving tile takes an interrupt when a message arrives. (Alternatively, the receiving tile discovers there is a message by—possibly periodically—polling an incoming network queue and transferring control to a handler upon message discovery). The interrupt handler then inspects the tag and determines a queue in memory or cache into which the packet should be enqueued. When the tile wants to read from a particular sending tile (or a given tag), it looks into the corresponding queue stored in memory and dequeues from a particular memory stored queue. While this approach is flexible, the cost associated with taking an interrupt and implementing the sorting based on inspecting the tag in software may be too expensive. Also, reading out of memory on the receive side is more costly than reading directly from a register assuming that the tile contains register mapped networks.

To accelerate receive side de-multiplexing, the dynamic networks include a sorting module that automatically sorts inbound packets into buffers that act as the de-multiplexing queues. This hardware de-multiplexing is provided to the register mapped processor interface to the dynamic network. The interface between the de-multiplexing queues and the main processor 200 is through register reads. For example, the processor 200 reads from a register name mapped to one of the de-multiplexing queues, and the word at the head of that queue is dequeued and provided to the processor 200. Optionally, data from a de-multiplexing queue can be read without being dequeued. The interface can optionally use a memory interface in which the processor uses loads and stores.

Figure 11:
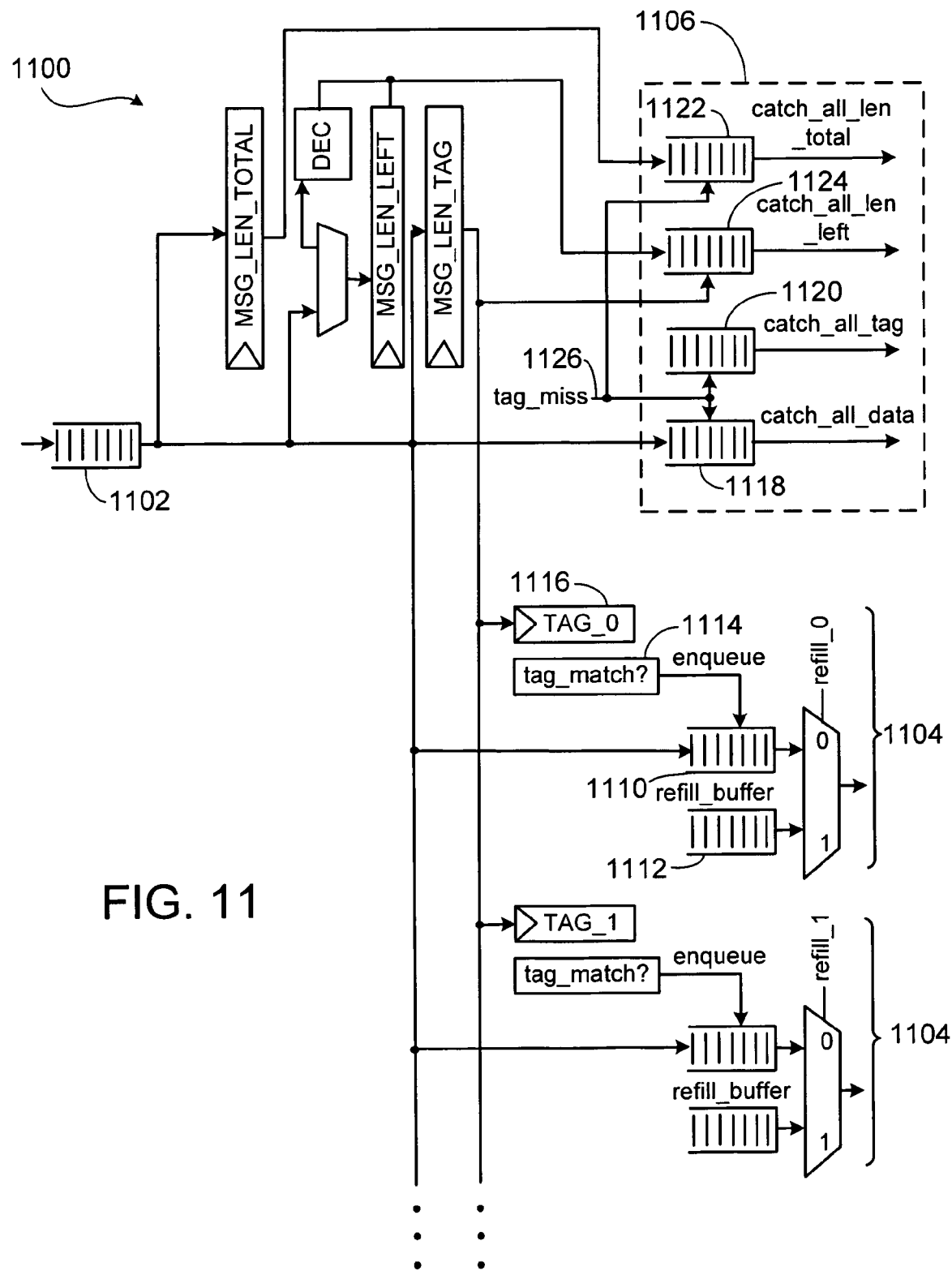
FIG. 11 is a block diagram of a sorting module.

FIG. 11 shows an implementation of a sorting module 1100 that provides data to the processor from an input buffer 1102, the sorting module 1100 includes one or more de-multiplexing queues 1104 that are each configured to store data from the input buffer 1102 based on a tag in the data. A catch-all queue 1106 stores data whose tag that does not match that of any of the de-multiplexing queues 1104 (a "tag miss"). Alternatively, the catch-all path from the input buffer 1102 can be coupled directly to the processor 200, bypassing the de-multiplexing queues. Optionally, the sorting module 1100 can trigger an interrupt to the processor 200 on a tag miss.

The number of de-multiplexing queues used by a given dynamic network can vary. For example, the UDN contains four hardware de-multiplexing queues in addition to a catch-all queue. The IODN contains two hardware de-multiplexing queues in addition to a catch-all queue. It may be beneficial to provide a number of de-multiplexing queues that is a power of two (e.g., 2, 4, 8, 16, etc.), such that each value of a multi-bit address corresponds to a de-multiplexing queue. In some implementations, if a circuit includes N tiles, each tile can include N de-multiplexing queues. In such a configuration, each sending tile is guaranteed at least one input queue at each potential receiving tile. In some implementations, a dynamic network may have only one de-multiplexing queue to separate data having a particular tag. Each of the de-multiplexing queues can be mapped into the processor's register space. To access the catch-all queue 1106, the processor can access a register that is associated with catch-all processing.

Each de-multiplexing queue 1104 is virtualized, having a main buffer 1110 and a refill buffer 1112 for providing data from a memory during deadlock recovery. A tag comparison module 1114 compares a tag stored in a tag register 1116 with a tag word of a packet as it is dequeued from the input buffer 1102. Alternatively, a tag can be distributed over multiple words. Each subsequent word of the packet is processed according to the same tag. In some cases, a packet may have a single word of data, and the tag is represented by a portion of that word.

4.4.2.1 De-Multiplexing Operation

Figure 12:
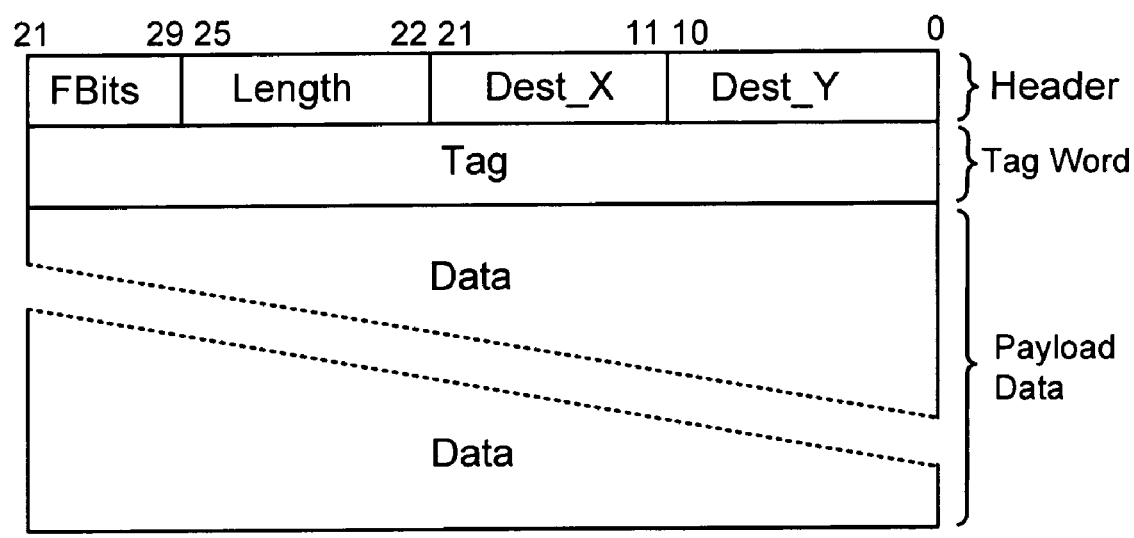
FIG. 12 is a diagram of a tagged packet.

During operation, each de-multiplexing queue contains an associated tag that can be changed in software by writing to the associated tag register 1116. Alternatively, the tags can be hard coded and a decoder can translate a tag in the data to one of the hard coded values. Hardcoded values can be, for example, 0, 1, 2, 3 and so on. For such values, the decoding of the tag becomes a simple indexing operation using the tag (with values, 0, 1, 2, or 3, for example) into a small memory array. Referring to FIGS. 11 and 12, the switch 220 first examines the header word 1200 of a packet in the input buffer 1102 to determine whether the packet destined for the processor of that tile. If so, the header can be removed and the tag and data passed to the sorting module 1100 in the tile. If not, the packet is routed out of the appropriate output port of the dynamic switch. The word following the header is the tag 1202. The sorting module 1100 compares the tag 1202 to the tag stored in the tag register 1116. If a match occurs, the tag is removed and the payload words 1204 of the packet are enqueued into the associated main buffer 1110 of the de-multiplexing queue 1104. If none of the stored tags match the packet's tag, the packet is routed into a catch-all data buffer 1118 of the catch-all queue 1106. The catch-all queue 1106 also includes a buffer 1120 to store the tag associated with the packet, a buffer 1122 to store the total length of the packet, and a buffer 1124 to store the length remaining in the current packet. This meta-data buffers use the same tag-miss control signal 1126 as the catch-all data buffer 1118. This meta-data is used to determine what tag and packet length is associated with each data word. The catch-all queue 1106 is also mapped to registers that can be read by the processor. Since multiple packets with differing tags can reside in the catch-all queue 1106, the processor uses this meta-data to distinguish one packet from another. The processor can optionally sort these packets not being handled by the hardware tagged de-multiplexing queues 1104 into software managed de-multiplexing queues (e.g., in on-tile cached memory).

The dynamic network's catch-all handling hardware is capable of signaling an interrupt on receipt of data. The receiving processor 200 can be configured to signal an interrupt on receipt of data to the catch-all queue 1106 by configuring special purpose registers. Alternatively, the data can be received by having the processor 200 poll the catch-all queue 1106. This configurability supports both a polling and interrupt model for packets with tags that are not currently assigned.

4.4.2.2 Managing Tags

Tags provide a namespace for different flows of data. The tag namespace does not need to be global across all tiles. Rather, the tag namespace can be specialized for different tiles. The usage, allocation, and management of tags can be controlled by software. For example, the compiler or programmer is able to manage the tag namespace and allocate tags. Possible allocation models for the tag space include a static mapping, a mapping that denotes the sending tile, a mapping where a tag denotes a flow of data, or a mapping where a tag is a one-time entity. Software is also able to determine what tag is currently present in the tag registers 1116 at any given time.

Another aspect of managing tags is the process of modifying resident tags and the semantics of updating a tag register 1116 while the tile is operating. To begin with, the sorting module 1100 can be stalled based on the value of a mode indicator. Modifying tags while the sorting module 1100 is still operating could lead to unpredictable results. Even though the sorting module 1100 can be stalled, care must still be taken when modifying the tag registers 1116 due to the atomic packet based nature of the dynamic networks.

When the sorting module 1100 is stalled, input buffer 1102 continues to receive data, but no new data will enter or leave the de-multiplexing queues 1104 or catch-all queue 1106. While the sorting module 1100 is stalled, it is safe to change tags stored in the tag registers 1116. When the sorting module 1100 resumes operation, messages begin to flow into the appropriate queues.

Care should be taken in the case where a packet has been partially sorted, but not in its entirety. In this case, the atomic unit of a packet has been partially sorted into a de-multiplexing queue 1104 or catch-all queue 1106, while the later portion of the packet is still waiting to be sorted. In order to address this scenario, when changing tags for packets that are in-flight special care should be taken.

The sorting module 1100 includes circuitry for detecting the state of the de-multiplexing queues 1104 and the catch-all queues 1106 to identify when a packet is partially sorted. For example, the state of the catch-all queue 1106 can be determined by comparing the values in the buffer 1122 storing the total length of the packet and the buffer 1124 storing the length remaining in the current packet. When updating a tag in the tag register 1116 of a de-multiplexing queue 1104 which is associated with a packet that is not completely sorted, the queue in which the packet is stored is emptied and that queue is placed into the catch-all queue, or it is "virtualized" in memory (i.e., stored into memory) to be read out from the refill buffer 1112. This way, the data from the old tag is received through the catch-all queue or through memory (virtualized), and the data from the new tag is received from the register mapped de-multiplexing queue 1104.

When multiple tiles share the same name space for tags, a "barrier synchronization" technique is used to ensure that all of the tile sharing the name space are able to coordinate changes to tags. For example, before a tag is updated, the processors in the tiles execute a barrier synchronization operation to indicate that new tag names will be used. A compiler (or a programmer) ensures that all processors execute the barrier synchronization operation at the appropriate time to coordinate the change in tag names with execution of the barrier synchronization operation.

4.4.2.3 Using Tags

There are several ways in which de-multiplexing tags can be added to a packet. A tag can be added to a message to be sent in a packet in software by a process that is running in the transmitting tile. For example, the processor executes an instruction to write tag data along with the packet data to be sent into the network. The encoded instruction can specify a tag to be used along with other header information associated with a message, such as an operand value for another tile. An exemplary add instruction for adding the values A and B, and sending the result over the network is:

add targetC, d, t, A, B

In this instruction, A is added to B and the result is inserted into a register mapped output buffer named targetC to be sent to a destination d with a tag of t. In a multi-issue processor, such as a VLIW processor or superscalar processor, multiple tags and destinations can be specified in each instruction.

Another way that a tag may be added to a packet is by circuitry in the tile configured to attach tags to packets. For example, the processor 200 accesses a special purpose register associated with each output buffer 232B of a register mapped switch interface 232. The special purpose register can provide various type of overhead information for a message to be sent into the network in a packet, including de-multiplexing tag, destination location for routing, and message length. After the processor 200 writes the message data into the register mapped output buffer and the overhead information into the special purpose register, and the message would automatically be injected into the network with the appropriate de-multiplexing tag and header.

The information stored in the special purpose registers can also be used for repeated messages sharing the same overhead information, such as de-multiplexing tag, source and destination address, and message length. By including a special purpose register and other specialized hardware in a tile to facilitate tag addition and message dispatch, the processor 200 can be freed to perform other computation while a message is injected into the network. This is especially useful for short (e.g., single word) messages because they can be sent without the processing overhead of constructing a header for each message in a related series of messages (e.g., scalar operands).

In some cases, it is useful for a path from a given source to a given destination to be the same for successive values. This is especially useful when instruction level parallelism (ILP) is being mapped across a number of processors connected by a network. When exploiting ILP, ordering is important for values being received. If a dynamic network preserves ordering of packets sent between any two tiles, but does not guarantee ordering of packets received at a tile from different senders, receive side de-multiplexing circuitry enables an efficient scheme for determining the sender of a packet and sorting the packets by sender (e.g., without having to read the packet header in software). In this case, the tags that are used to sort packets can be assigned by a compiler to identify each sending and receiving pair of tiles.

Figure 13A:
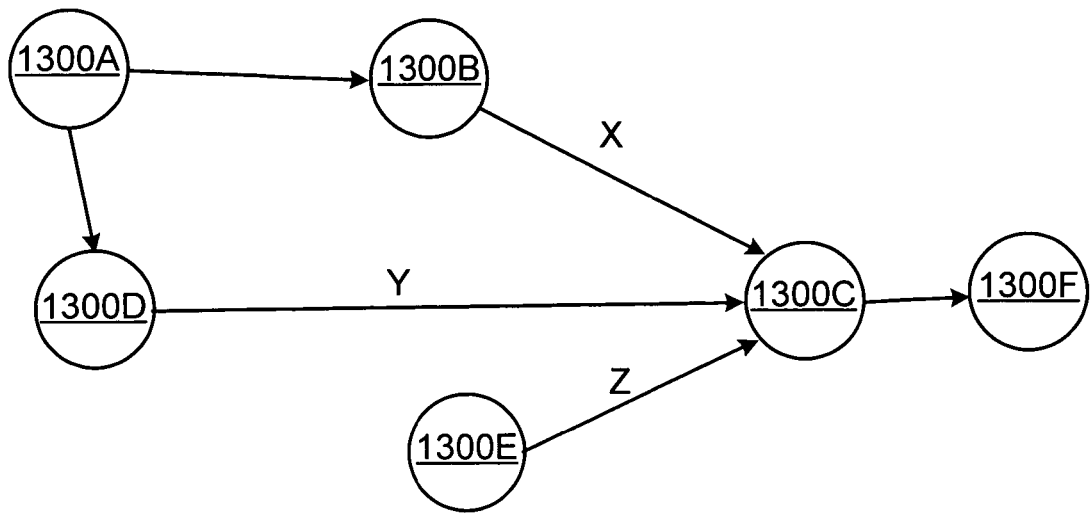
FIGS. 13A and 13B are graphs representing communicating processes.

Referring to FIG. 13A, multiple communicating processes 1300A-1300F are each mapped to a processor in a different tile and the communication between processes flows over a dynamic network. In this example, processes 1300B, 1300D, and 1300E are all sending messages to process 1300C. Without receive side de-multiplexing circuitry, process 1300C would need to expend processor time to determine which process any incoming message was coming from. With receive side de-multiplexing circuitry, each of the processes 1300B, 1300D, and 1300E are able to tag any messages that they send to process 1300C with different tags (e.g., x, y, z, respectively) to denote their specific flows. Process 1300C configures its receive side de-multiplexing circuitry to automatically de-multiplex the messages into independent queues that can quickly be read on the processor on which process 1300C is running.

Figure 13B:
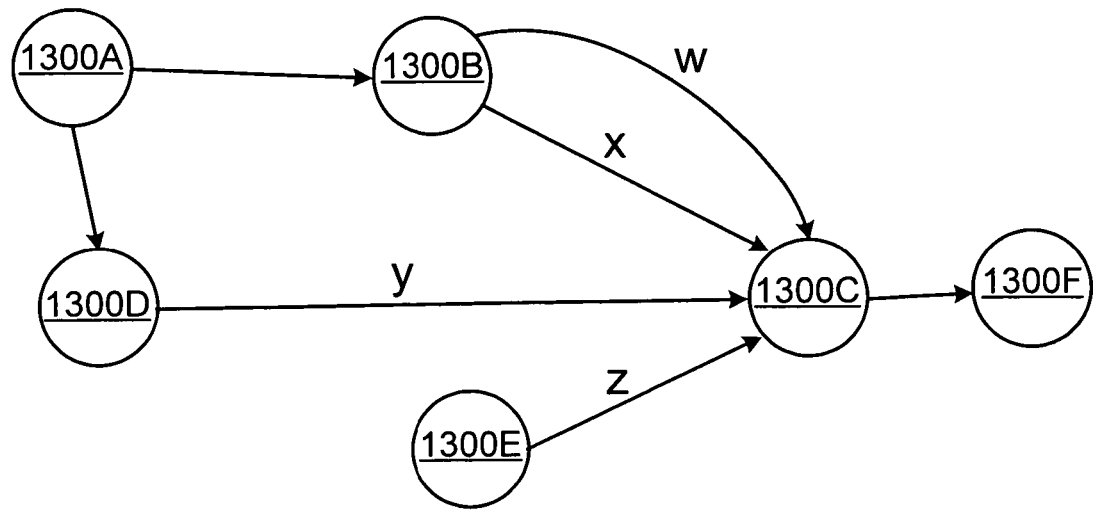

Receive side de-multiplexing can also support multiple flows between two nodes. Receive side de-multiplexing can de-multiplex not only flows from multiple tiles to one receiving tile, but multiple flows of traffic from one tile to a singular other tile. FIG. 13B shows an example in which process 1300B is sending two independent flows over a dynamic network with hardware de-multiplexing to process 1300C. These two flows are tagged w and x, respectively.

Dynamic networks with receive-side de-multiplexing can also be used with streams built on top of dynamic message packets. With the addition of receive side de-multiplexing, it is possible to implement long-lived persistent streams of data between communicating tiles. If the communication channels are streams of values, the streams will be packetized when sent over the network. With efficient receive side de-multiplexing and automatic removal of headers and tags by the de-multiplexing circuitry, packetization is transparent to the receiver.

When utilizing receive side de-multiplexing, a programmer, automated tool, or compiler may determine that all of the dedicated de-multiplexing queues have been used at a particular receiving tile (a "full tile"), but another tile which is already communicating with the full tile has available queue space (an "available tile"). If third tile needs to communicate with the full tile, it is possible that node under the direction of a programmer, automated tool, or compiler, the third tile can send its messages destined for the full tile to the available tile already communicating with the full tile. Then the available tile can proxy that message onto the full tile for the third tile.

Various features of the tiled integrated circuit architecture and programming described herein can be implemented by modifying versions of the tiled integrated circuits described in the following publications: "Baring It All to Software: RAW Machines" *IEEE Computer*, September 1997, pp. 86-93, "Space-Time Scheduling of Instruction-Level Parallelism on a Raw Machine," *Proceedings of the Eighth International Conference on Architectural Support for Programming Languages and Operating Systems (ASPLOS-VIII)*, San Jose, Calif., Oct. 4-7, 1998, "Raw Computation" *Scientific American*, August 1999, Vol. 281, No. 2, pp. 44-47, "The Raw Microprocessor: A Computational Fabric for Software Circuits and General Purpose Programs," *IEEE Micro*, March/April 2002, pp. 25-35, and "A 16-issue multiple-program-counter microprocessor with point-to-point scalar operand network," *Proceedings of the IEEE International Solid-State Circuits Conference*, February 2003, each of which is incorporated herein by reference.

It is to be understood that the foregoing description is intended to illustrate and not to limit the scope of the invention, which is defined by the scope of the appended claims. Other embodiments are within the scope of the following claims.

What is claimed is:

1. An integrated circuit comprising:
a plurality of tiles, each tile comprising
a processor;
a switch including switching circuitry to forward data words over data paths from other tiles to the processor and to switches of other tiles; and
memory coupled to the switch to buffer data transmitted among the tiles;
a plurality of networks among the tiles with each network comprising switches of the tiles and dedicated data paths directly connecting switches of neighboring tiles, with data paths between neighboring tiles including different respective sets of said data paths dedicated to different networks to enable different networks to transfer data over the respective sets of data paths without sharing the same data paths between neighboring tiles, and
at least a first one of the networks configured to transmit data among the tiles reserving sufficient buffer space in the memories coupled to the switches to prevent limited-buffer deadlock conditions from occurring, and at least a second one of the networks configured to transmit data among the tiles allowing limited-buffer deadlock conditions to occur and detecting and recovering from limited-buffer deadlock conditions.

2. The integrated circuit of claim 1, wherein at least one of the networks that transmits data among the tiles preventing limited-buffer deadlock conditions is configured to provide separate buffer space in the memory coupled to the switches for data transmitted over different logical channels.

3. The integrated circuit of claim 1, wherein at least one of the networks configured to transmit data among the tiles preventing limited-buffer deadlock conditions is configured to use credit based flow control.

4. The integrated circuit of claim 1, wherein at least one of the networks configured to transmit data among the preventing limited-buffer deadlock conditions is configured to provide separate physical channels between tiles for request data and response data.

5. The integrated circuit of claim 1, wherein at least two of the networks are configured to transmit data among the tiles detecting and recovering from limited-buffer deadlock conditions.

6. A method for transmitting data in an integrated circuit, the integrated circuit comprising a plurality of tiles, each tile comprising a processor, a switch including switching circuitry to forward data over data paths from other tiles to the processor and to switches of other tiles, and memory coupled to the switch to buffer data transmitted among the tiles, with a plurality of networks among the tiles with each network comprising switches of the tiles and dedicated data paths directly connecting switches of neighboring tiles, the method comprising:

transmitting data over a first network among the tiles reserving sufficient buffer space in the memories coupled to the switches to prevent limited-buffer deadlock conditions from occurring; and transmitting data over a second network among the tiles allowing limited-buffer deadlock conditions to occur and detecting and recovering from limited-buffer deadlock conditions;

the first network and the second network transferring data over data paths between neighboring tiles that include different sets of said data paths dedicated to the first network and to the second network to enable different networks to transfer data over the respective sets of data paths without sharing the same data paths between neighboring tiles.

7. The method of claim 6, wherein at least one of the networks that transmits data among the tiles preventing limited-buffer deadlock conditions is configured to provide separate buffer space in the memory coupled to the switches for data transmitted over different logical channels.

8. The method of claim 6, wherein preventing limited-buffer deadlock conditions includes using credit based flow control.

9. The method of claim 8, wherein using credit based flow control comprises selecting an outstanding unacknowledged data credit limit to reserve sufficient buffer space in the memories coupled to the switches to prevent limited-buffer deadlock conditions.

10. The method of claim 6, wherein preventing limited-buffer deadlock conditions includes providing separate physical channels between tiles for request data and response data.

11. The method of claim 6, wherein recovering from limited-buffer deadlock conditions in the second network includes transmitting data among the tiles over the first network.

12. The integrated circuit of claim 1, wherein each of the plurality of networks comprises a dimension-ordered wormhole routed network.

13. The integrated circuit of claim 1, wherein the second network is configured to use buffer space in memory external to the tiles to recover from limited-buffer deadlock conditions.

14. The integrated circuit of claim 13, wherein the external memory has cache on one or more of the tiles.

15. The integrated circuit of claim 13, wherein the second network is configured to drain buffer space in the memories coupled to the switches to the external memory over the first network in response to detecting a limited-buffer deadlock condition.

16. The integrated circuit of claim 1, wherein the second network is configured to detect limited-buffer deadlock conditions using a timer in each of multiple tiles that counts how many cycles data stays in buffer space in memories coupled to the switches without making forward progress.

17. The integrated circuit of claim 16, wherein detecting a limited-buffer deadlock condition includes one or more of the counters reaching a predetermined threshold.

18. An apparatus comprising:

a plurality of tiles, each tile comprising a processor, a switch including switching circuitry to forward data words over data paths from other tiles to the processor and to switches of other tiles, memory coupled to the switch to buffer data transmitted among the tiles, and a timer configured to count how many cycles data stays in buffer space in the memory without making forward progress; and external memory coupled to at least one of the tiles and external to the tiles;

a plurality of networks among the tiles with each network comprising switches of the tiles and dedicated data paths directly connecting switches of neighboring tiles, with data paths between neighboring tiles including different respective sets of said data paths dedicated to different networks to enable different networks to transfer data over the respective sets of data paths without sharing the same data paths between neighboring tiles, and at least a first one of the networks configured to transmit data among the tiles reserving sufficient buffer space in the memories coupled to the switches to prevent limited-buffer deadlock conditions from occurring, and at least a second one of the networks configured to transmit data among the tiles allowing limited-buffer deadlock conditions to occur and detecting limited-buffer deadlock conditions using the timers and recovering from limited-buffer deadlock conditions using the external memory.

19. The apparatus of claim 18, wherein the second network is configured to drain buffer space in the memories coupled to the switches to the external memory over the first network in response to detecting a limited-buffer deadlock condition.

20. The integrated circuit of claim 1, wherein each tile includes multiple switches, where different switches are dedicated to different respective networks.

* * * * *